(12) United States Patent
Wang et al.

(10) Patent No.: US 11,560,951 B2
(45) Date of Patent: Jan. 24, 2023

(54) PIPELINE VALVE FOR CLOSING AND/OR SWITCHING

(71) Applicant: XIAMEN LOTA INTERNATIONAL CO., LTD., Xiamen (CN)

(72) Inventors: Xuedong Wang, Xiamen (CN);
Jiangcheng Zhang, Xiamen (CN);
Chuanbao Zhu, Xiamen (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 59 days.

(21) Appl. No.: 16/817,452

(22) Filed: Mar. 12, 2020

(65) Prior Publication Data

US 2020/0318745 A1 Oct. 8, 2020

(30) Foreign Application Priority Data

Mar. 12, 2019 (CN) .......................... 201910186651.7
Mar. 12, 2019 (CN) .......................... 201920311710.4
Dec. 11, 2019 (CN) .......................... 201911265550.5
Dec. 11, 2019 (CN) .......................... 201922210116.9

(51) Int. Cl.
*F16K 31/385* (2006.01)
*F16K 1/36* (2006.01)
*F16K 27/02* (2006.01)
*F16K 11/078* (2006.01)
*F16K 1/42* (2006.01)

(52) U.S. Cl.
CPC .............. *F16K 1/36* (2013.01); *F16K 11/078* (2013.01); *F16K 27/02* (2013.01); *F16K 31/3855* (2013.01); *F16K 1/42* (2013.01)

(58) Field of Classification Search
CPC .... E03C 1/023; F16K 11/0445; F16K 11/078; F16K 31/3855; F16K 1/36
See application file for complete search history.

(56) References Cited

U.S. PATENT DOCUMENTS

| 3,524,470 | A | * | 8/1970 | Kahcarllcjr | ........... F16K 31/528 |
| | | | | | 137/624.18 |
| 8,474,482 | B2 | * | 7/2013 | Melle | ..................... F16K 31/563 |
| | | | | | 137/625.11 |
| 9,376,790 | B2 | * | 6/2016 | Sharratt | .................. E03C 1/023 |
| 2013/0248034 | A1 | * | 9/2013 | Zhou | ..................... F16K 11/074 |
| | | | | | 137/871 |
| 2019/0301621 | A1 | * | 10/2019 | Guindi | .................. F16K 11/085 |

\* cited by examiner

*Primary Examiner* — Michael R Reid
(74) *Attorney, Agent, or Firm* — Barnes & Thornburg LLP

(57) ABSTRACT

The present disclosure provides an adjustable pipeline valve for changing and/or switching the discharge water flow path. The pipeline valve includes: a valve body; an inlet in communication with the valve body; and at least one outlet in communication with the valve body. The pipeline valve further includes: a water stopping member located within a chamber of the valve body and preventing direct communication between the inlet and the at least one outlet; a plugging assembly located in at least one receiving hole in a part of the valve body, the at least one receiving hole being in one-to-one correspondence with at least one water passing hole in the water stopping member; and a switching assembly 17 configured to allow the plugging assembly to block a corresponding water passing hole by a rotation of the switching assembly 17 to switch the communication between the inlet and the at least one outlet.

20 Claims, 21 Drawing Sheets

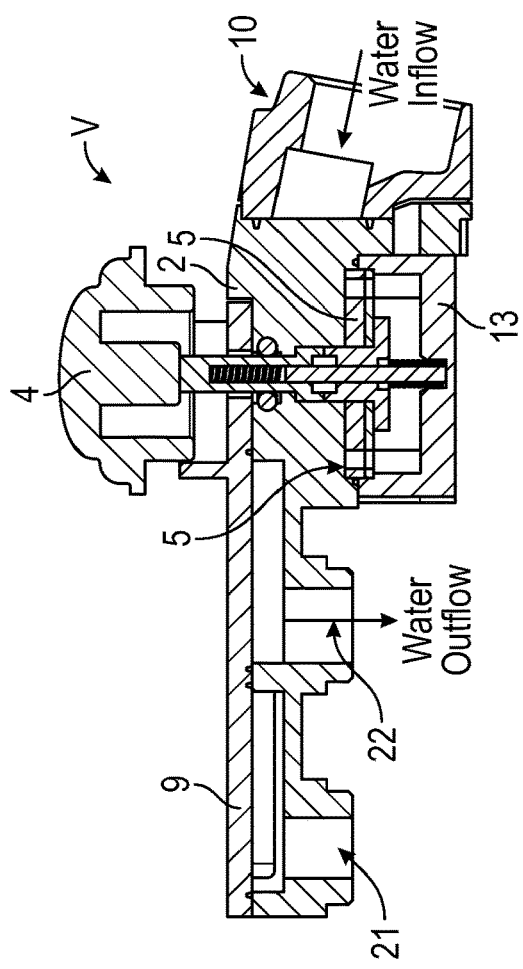
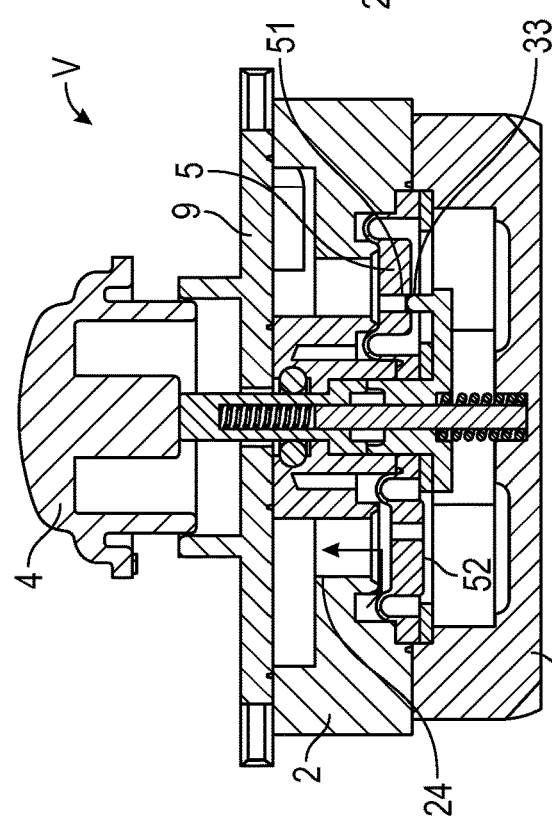
FIG. 10A
FIG. 10B
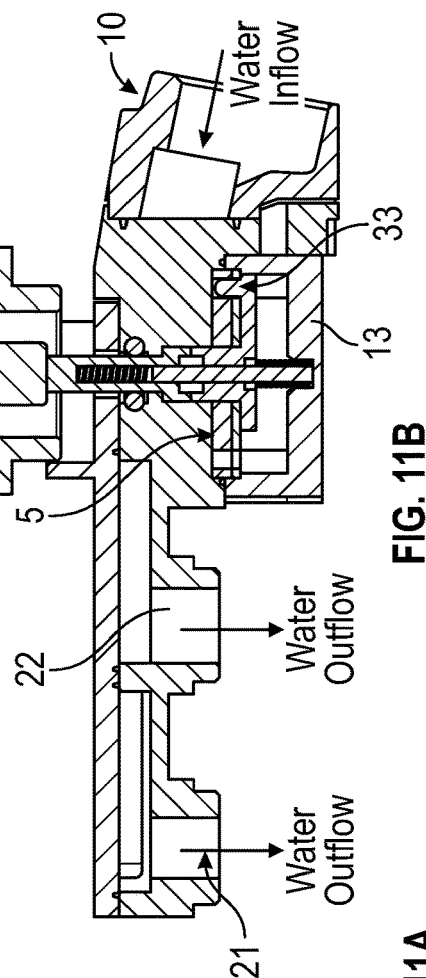
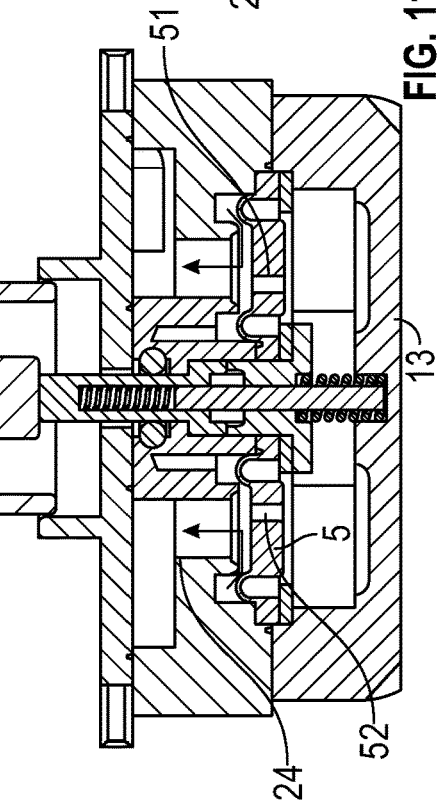
FIG. 11A
FIG. 11B

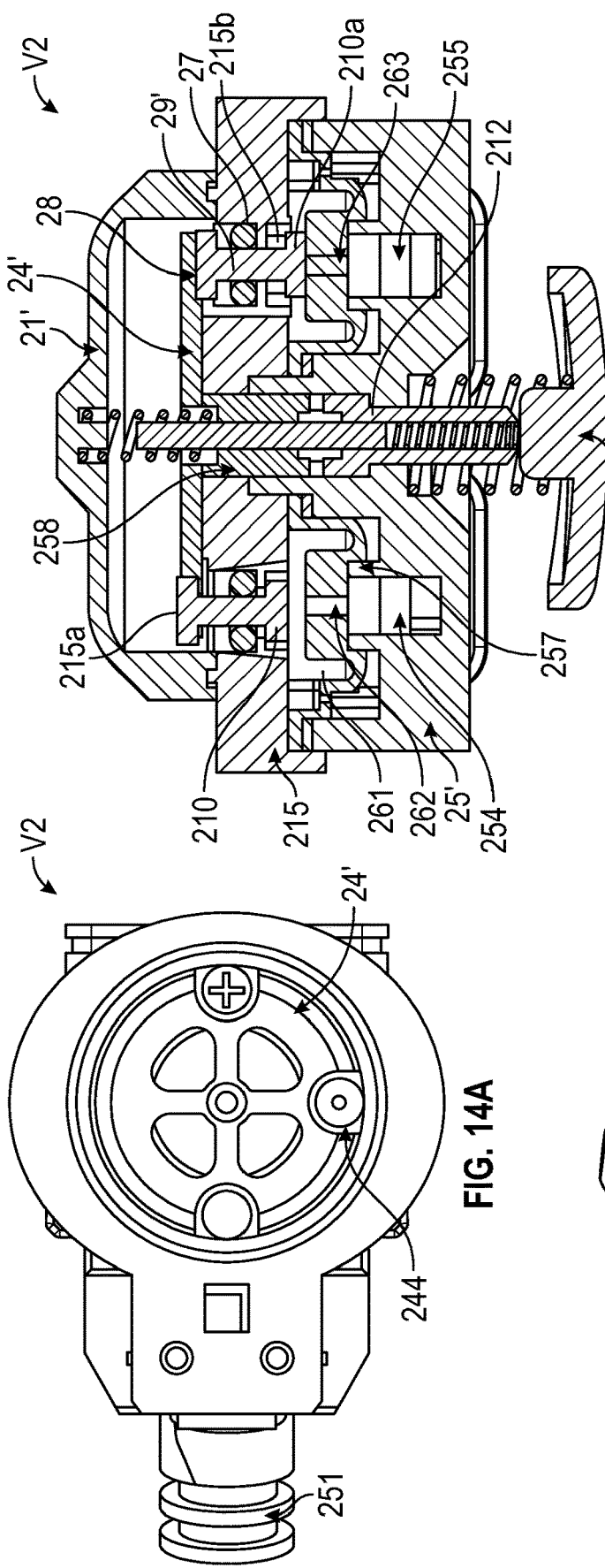

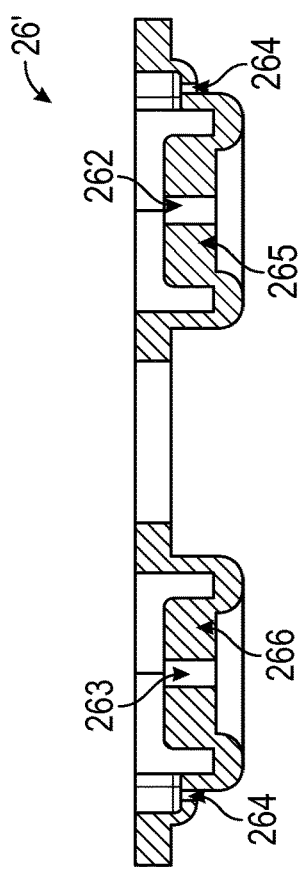
FIG. 19A
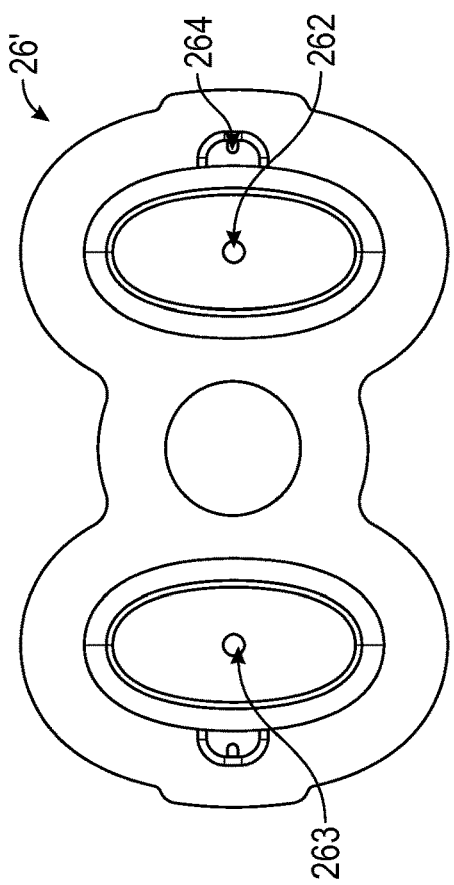
FIG. 19B
FIG. 19C
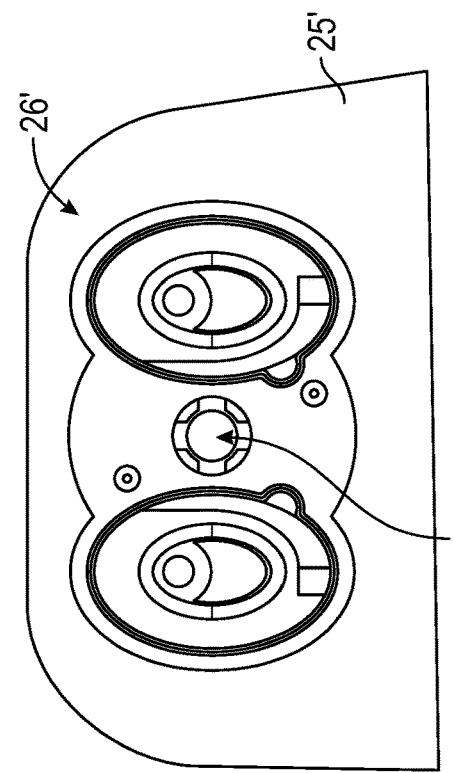
FIG. 19D

PIPELINE VALVE FOR CLOSING AND/OR SWITCHING

CROSS REFERENCE TO OTHER APPLICATIONS

This application claims the benefit of the following applications: Chinese Patent Application Serial No. 201910186651.7 filed on Mar. 12, 2019; Chinese Patent Application Serial No. 201920311710.4 filed on Mar. 12, 2019; Chinese Patent Application Serial No. 201911265550.5 filed on Dec. 11, 2019; and, Chinese Patent Application Serial No. 201922210116.9 filed on Dec. 11, 2019, the disclosure of which are hereby incorporated by reference in its entirety for all purposes.

TECHNICAL FIELD

The present disclosure relates to a technical field of pipeline water valves. In particular, the pipeline valve can be easily operated to adjust, including closing and/or switching, the flow of water through the valve by a person.

BACKGROUND

In the case where plumbing fittings are provided, there are often some problems when it is required to switch between two outlets, for example between an outlet leading to a bathtub and an outlet leading to a showerhead or a shower wand. A switching valve between the bathtub and showerhead outlets can be provided in the bathtub or the showerhead. It is known that a pipe leading to the showerhead can include the switching valve actuated by a control lever or a switch button. It is also known that the control lever can be actuated (e.g., pivoted or swung) and the switch button can be pressed, pulled or rotated.

However, when a propelling device in the valve is urged to move by the control lever, to advance the valve from a stable, discharge position to another stable, discharge position, a significantly large force is required. This significantly large force to actuate the valve makes it difficult for some people to consistently operate the valve, thereby reducing its utility, desirability and operating efficiency.

This disclosure addresses shortcomings discussed above and other problems and provides advantages and aspects not provided by the prior art of this type. A full discussion of the features and advantages of the present disclosure is deferred to the following detailed description, which proceeds with reference to the accompanying drawings.

SUMMARY

Thus, in order to at least partially address the above technical problems, the present disclosure provides a pipeline valve for closing and/or switching.

According to one aspect of the present disclosure, the pipeline valve is easily operated to adjust, including closing and/or switching, the flow of water through the valve by a person. The pipeline valve includes a valve body; an inlet in communication with the valve body; and at least one outlet in communication with the valve body. The pipeline valve further includes a water stopping member located within a chamber of the valve body and preventing direct communication between the inlet and the at least one outlet; a plugging assembly located in at least one receiving hole in a part of the valve body, the at least one receiving hole being in one-to-one correspondence with at least one water passing hole in the water stopping member; and a switching assembly configured to allow the plugging assembly to block a corresponding water passing hole by a rotation of the switching assembly to switch the communication between the inlet and the at least one outlet.

According to another aspect of the present disclosure, the pipeline valve includes a valve body; an inlet in communication with the valve body; and at least one outlet in communication with the valve body. The pipeline valve further includes: a water stopping member located within a chamber of the valve body and preventing direct communication between the inlet and the at least one outlet; and a switching assembly configured to cooperate with a corresponding water passing hole in the water stopping member by a rotation of the switching assembly to switch the communication between the inlet and the at least one outlet.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTIONS OF THE DRAWINGS

In order to more clearly describe the embodiments of the present disclosure, the Figures depict one or more implementations in accord with the present teachings, by way of example only, not by way of limitation. In the figures, like reference numerals refer to the same or similar elements:

FIGS. 10A and 10B are, respectively, two cross-sectional views of the pipeline valve V where the button is pressed for the second time and water is discharged from the second outlet, but not from the first outlet, as the valve V switches from a state II to a state III;

FIGS. 11A and 11B are, respectively, two cross-sectional views of the pipeline valve V where the button being pressed for the third time and water discharged from both the first and second outlets, as the valve V switches the state III to a state IV;

FIG. 14A is a top view of the pipeline valve V2 in an initial state I ("state I"), wherein water is only discharged from a first outlet of the valve V2;

FIG. 14B is a cross-sectional view of the pipeline valve V2 in state I and taken along line 14B in FIG. 14A;

FIG. 14C is a side view of the pipeline valve V2 in state I;

FIG. 19A is a cross-sectional view of a water stopping member of the pipeline valve V2;

FIG. 19B is a bottom view of the water stopping member of FIG. 19A;

FIG. 19C is a top view of the water stopping member of FIG. 19A;

FIG. 19D is a bottom view of the water stopping member affixed to the lower valve body;

DETAILED DESCRIPTION

Figure 1A:
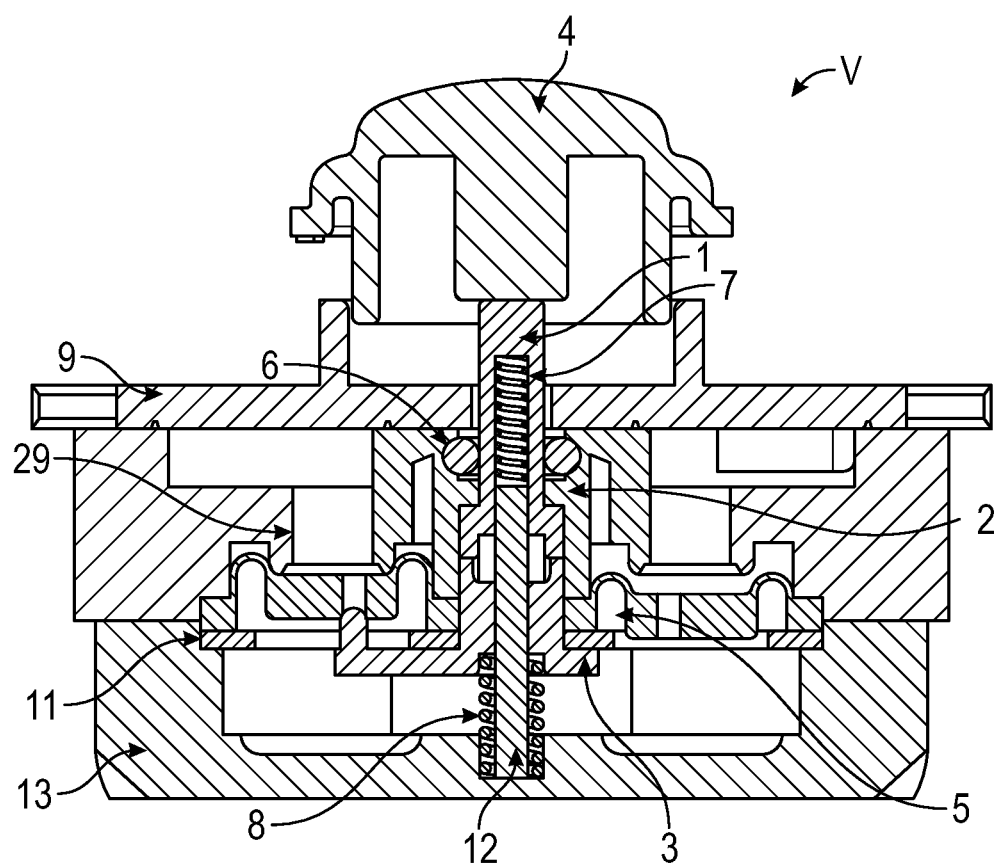
FIGS. 1A and 1B are, respectively, a cross-sectional view and an exploded view of a pipeline valve V according to a first embodiment of the present disclosure.

Although various modifications and alternative forms can be included in the present disclosure, the specific embodiments of the present disclosure are illustrated in the drawings as examples and will be described in the specification in detail. However, it should be understood that the accompanying drawings and the detailed description are not intended to limit the present disclosure to be the specific forms therein, but rather, to cover all modifications, equivalents, and alternatives within the spirit and scope of the present disclosure defined by the appended claims. The drawings are intended for illustrative purposes and are therefore not drawn to scale.

Terms such as "first", "second" and the like are used in this specification, and they are not intended to give an order or represent importance or primary and secondary relationship, but to distinguish different components.

FIGS. 1-11 show a first embodiment of a pipeline valve V that can be easily operated to adjust, including closing and/or switching, the flow of water through the valve by a person. As shown in FIGS. 1A and B the pipeline valve V generally includes a valve body, an inlet, an outlet, a water stopping member 5, and a switching assembly 17. In this embodiment, the valve body assembly includes a water dividing plate (or an upper valve body) 9, a switching body 2 (or a lower valve body), a water sealing plate 11, a water sealing cover (or a lower cover body) 13, and a water inflow body 10 which are fitted to each other or assembled together to form the valve V. As discussed below, the pipeline valve V includes an actuator (e.g., button 4) that an operator or person can efficiently and accurately actuate to change the water discharge flow path of the valve V. The pipeline valve V can be implemented with a showerhead where one of the valve's discharge outlets can discharge massage or jet-style water with greater discharge pressure, and a second discharge outlet can discharge a stream of water with lesser discharge pressure, or both types of discharge water through both discharge outlets at the same time.

Figure 1B:
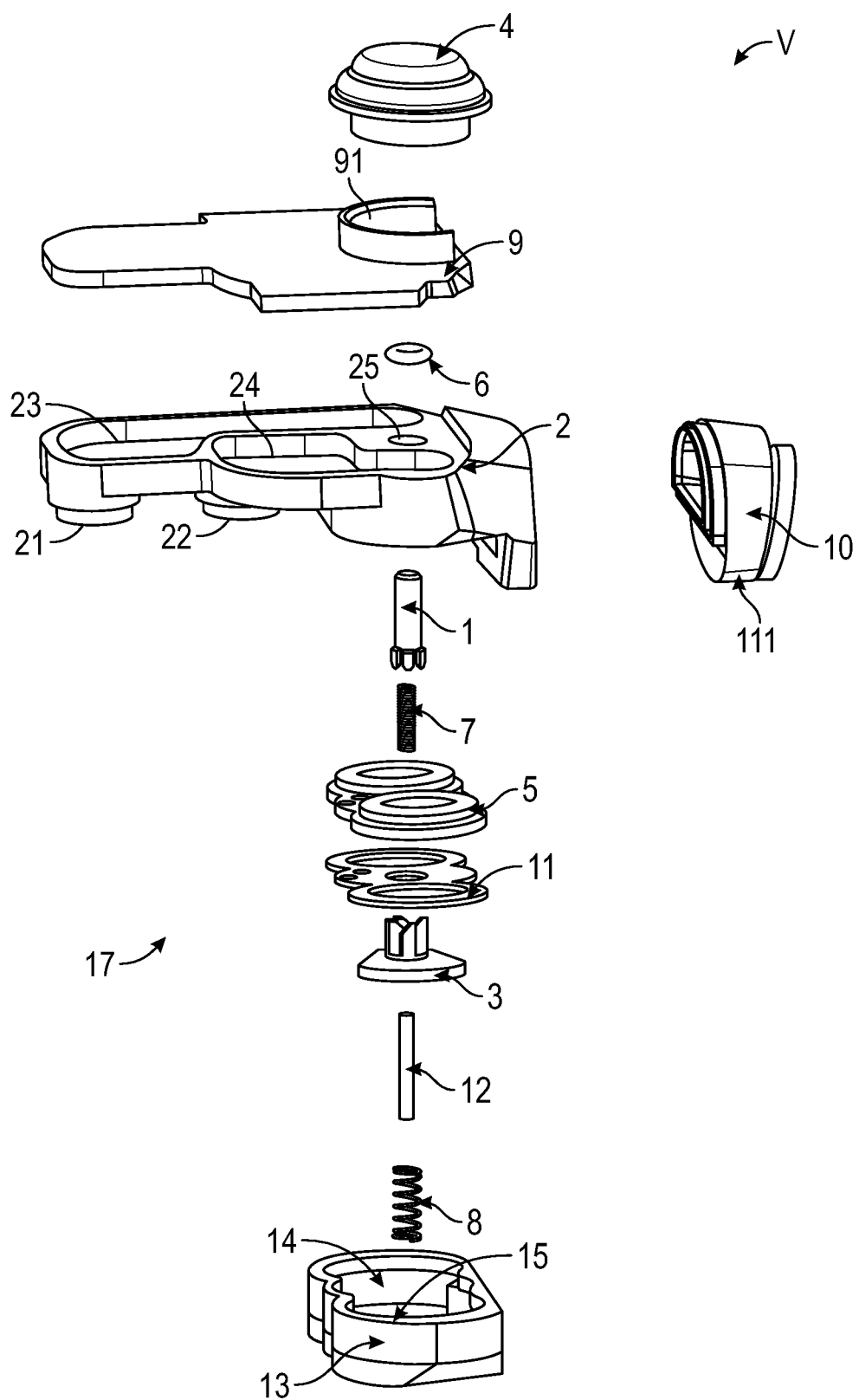
Figure 2A:
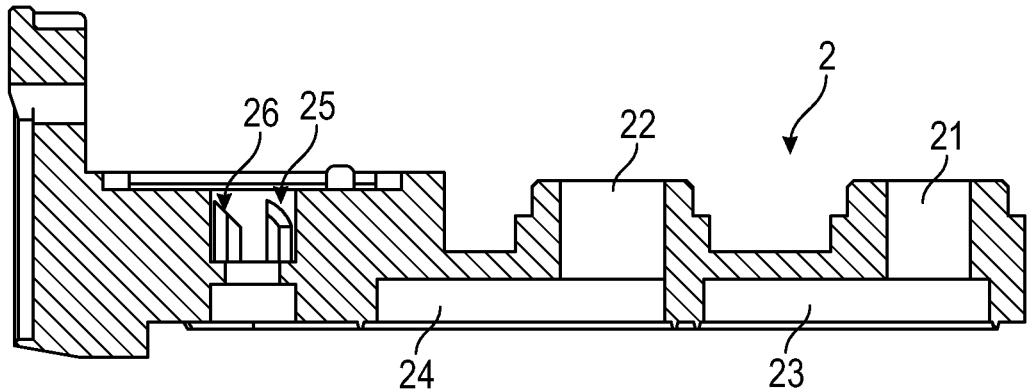
FIGS. 2A and 2B are, respectively, a cross-sectional view and a bottom view of a switching body of a switching assembly of the pipeline valve V, the switching body having a guide slot that receives an extent of a switching body.
Figure 2B:
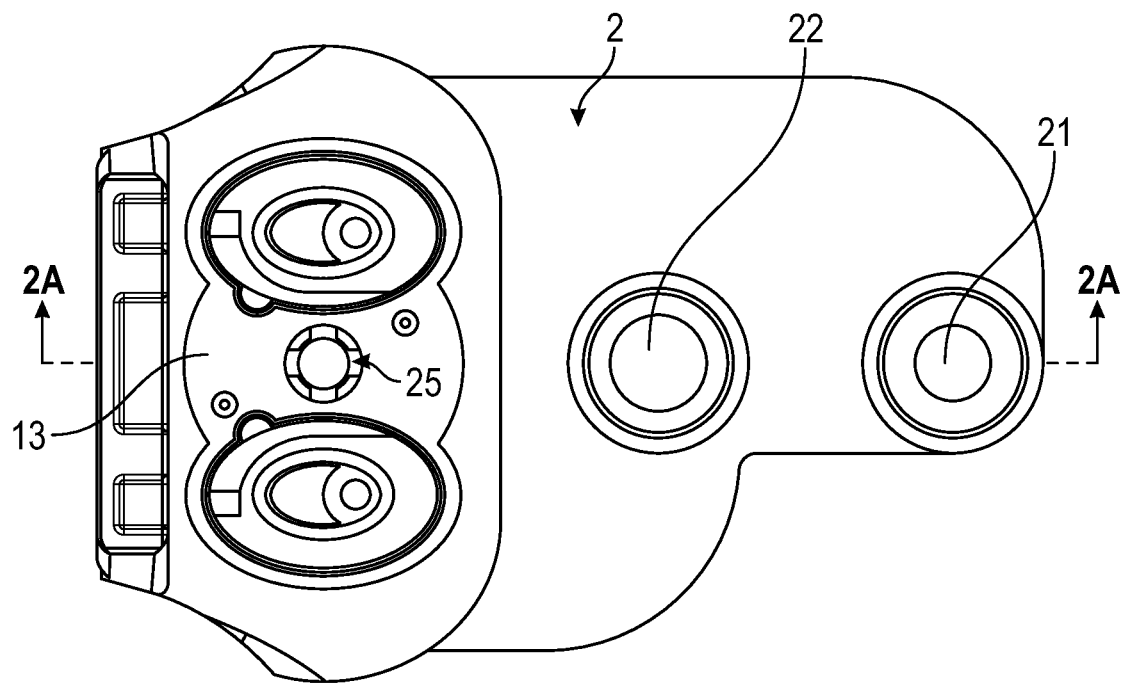
Figure 3A:
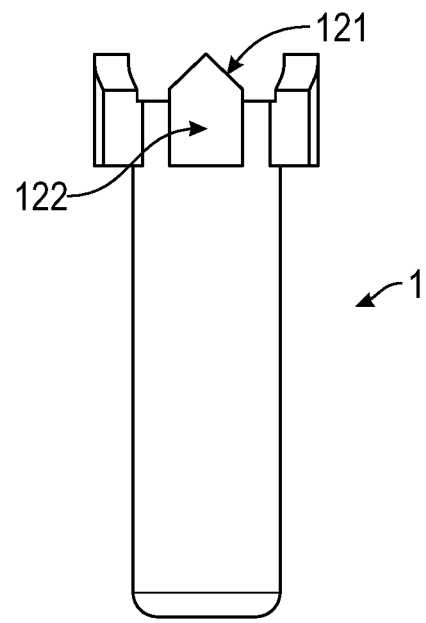
FIGS. 3A and 3B are, respectively, a side view and a top view of a switching shaft of the switching assembly of the pipeline valve V.
Figure 3B:
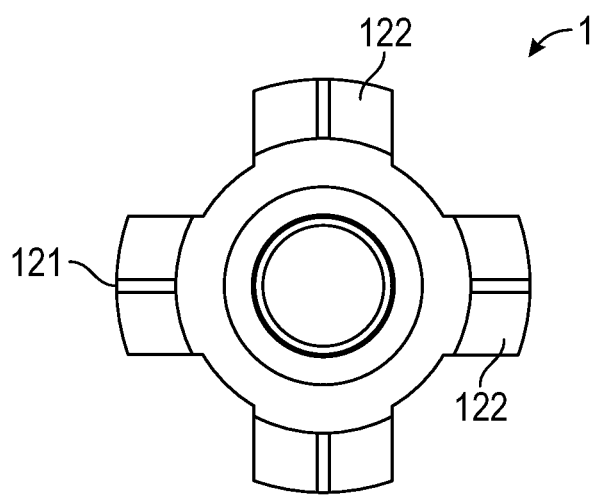

Referring to FIG. 1B, the water inflow body 10 is fixedly or sealingly connected to a right end of the switching body 2, and the water inflow body 10 is provided with an inlet 111 communicating with the valve body. Correspondingly, a first outlet 21 and a second outlet 22 are sequentially provided on a left end of the switching body 2, and the first outlet 21 and the second outlet 22 are respectively in communication with the valve body. It should be noted that, in this example, one inlet and two outlets are taken as an example to illustrate the design concept of the present disclosure, but it should be understood that the number of them may be adjusted by those skilled in the art according to actual needs, and it is not limited to the example illustrated herein.

Corresponding to the first outlet 21 and the second outlet 22, a first water discharging chamber 23 and a second water discharging chamber 24 are provided on a middle portion of the switching body 2, and they are closed by the water dividing plate 9 (specifically from an upper portion thereof). The inlet 111 in the water inflow body 10 communicates with a water inflow chamber 112 (shown in FIG. 6A) in the switching body 2, and the communication/blocking of the inlet to/from the first water discharging chamber 23 and the second water discharging chamber 24 is realized via a water stopping member 5.

The water sealing plate 11 and the water sealing cover 13 are sequentially disposed under the water stopping member 5, a water receiving chamber 14 is provided in the water sealing cover 13, and the water receiving chamber 14 is also sealed by the water sealing plate 11 and the water stopping member 5 (for example, from the upper portion thereof), i.e., the communication/blocking to/from the first water discharging chamber 23 and the second water discharging chamber 24, and the communication/blocking to/from the water inflow chamber 112 are realized by the water stopping member 5.

In fact, the purpose of providing the water stopping member 5 in a chamber of the valve body assembly is mainly to prevent direct communication between the inlet 111 and the first outlet 21 and the second outlet 22, so that a selective communication between them may be achieved by the switching assembly 17 described later. The switching assembly 17 is configured to cooperate with corresponding water passing holes 51, 52 in the water stopping member 5 by a rotation of the switching assembly 17 to close the communication of the inlet 111 with the first outlet 21 and the second outlet 22 and/or switch between the first outlet 21 and the second outlet 22.

Figure 5A:
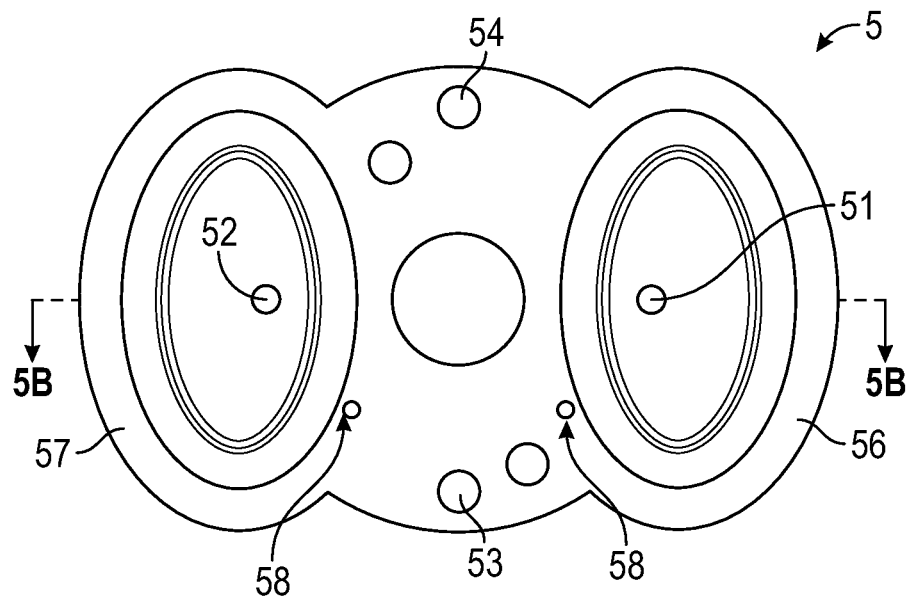
FIGS. 5A and 5B are, respectively, a top view and a cross-sectional view of a water stopping member of the pipeline valve V.
Figure 5B:
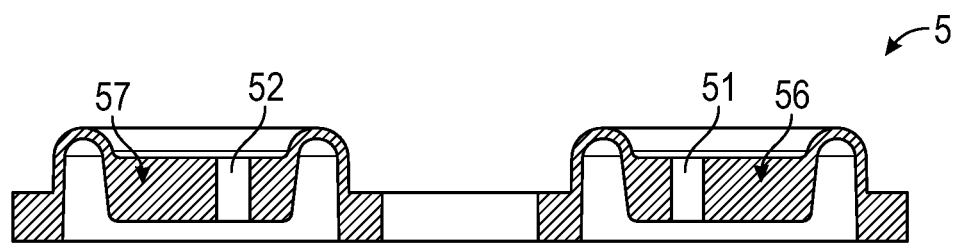
Figure 5C:
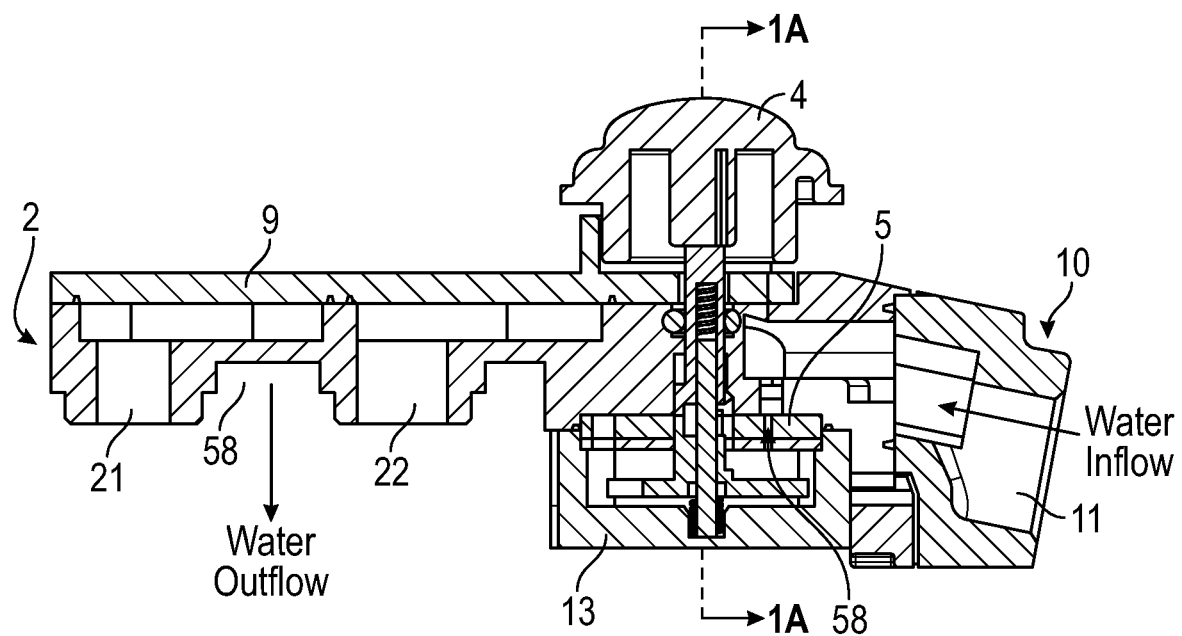
FIG. 5C is a schematic diagram of water flow through an overflow hole in the water stopping member while in a use position of the pipeline valve V.

In order to achieve switching between the first outlet 21 and the second outlet 22 or closing the first outlet 21 and the second outlet 22, the water passing holes in the water stopping member 5 includes a first water passing hole 51 in communication with the first water discharging chamber 23 and a second water passing hole 52 in communication with the second water discharging chamber 24, when assembled into the valve body. It can be understood that the number of the water passing holes in the water stopping member 5 is generally set to be identical to the number of the water discharging chambers, and the size of the water passing holes may be set according to actual needs. In addition, specifically referring to FIGS. 5A, 5B, and 5C, the water stopping member 5 is provided with at least one overflow hole 58 (as shown in FIG. 5C, two overflow holes 58 are shown) in addition to the first water passing hole 51 and the second water passing hole 52, to achieve the communication between the water inflow chamber 112 and the water receiving chamber 14.

In one example, the water stopping member 5 is a water stopping pad made of an elastic material, and includes a body and a first water stopping flange portion 56 and a second water stopping flange portion 57 disposed on the body, as shown in FIGS. 1A, 5A, 5B, and 5C, at least a portion of the first water stopping flange portion 56 and the second water stopping flange portion 57 are housed in water stopping ribs 29 of the switching body 2, so as to allow the water stopping member 5 to push the first water stopping flange portion 56 and/or the second water stopping flange portion 57 upward to cooperate with the water stopping ribs 29 on the switching body 2 to achieve sealing the first water discharging chamber 23 and/or the second water discharging chamber 24 accordingly, when a larger water pressure from the water receiving chamber 14 is applied to the water stopping member 5. The body is further provided with a first receiving hole 53 and a second receiving hole 54 in a region outside the region surrounded by the first water stopping flange portion 56 and the second water stopping flange portion 57, the first receiving hole 53 and the second receiving hole 54 are located on a straight line perpendicular to a virtual straight line connecting the first water passing hole 51 to the second water passing hole 52. In fact, the first water passing hole 51, the second water passing hole 52, the first receiving hole 53 and the second receiving hole 54 are located on a virtual circle centered on a center axis of a guide slot in the water stopping member 5, so as to house a protrusion 33 on a switching member or sheet 3 (described later) during the switching operation of the switching assembly 17.

It should be noted that, the size of the first water stopping flange portion and the second water stopping flange portion, and the number and size of the first receiving hole, the second receiving hole, and the like can be set according to actual needs. In addition, it should be noted that, referring to FIG. 5A, mounting and positioning holes (not shown) may be provided in the vicinity of the first receiving hole 53 and the second receiving hole 54 to facilitate the mounting and positioning. They will not be discussed in detail herein.

As shown in FIG. 1B, the switching assembly 17 includes a switching shaft 1, a first spring 7, a switching member or sheet 3, a guide shaft 12, a second spring 8, and an actuator, such as button 4, on the top of the switching shaft 1. If necessary, an O ring 6 may be provided on the switching shaft 1 to achieve the seal between the switching shaft 1 and the switching body 2. In order to install the switching assembly 17 in the valve body, each of the water dividing plate 9, the switching body 2, the water stopping member 5, the water sealing plate 11 and the water sealing cover 13 is provided with a guide slot at its center (as shown in the drawings, each of them is provided with a guide slot, but for the sake of simplicity of illustration, only the guide slot 25 on the switching body 2 is shown). The pipeline valve V can be installed in a support surface, such as a wall, wherein the button 4 is substantially flush with an outer surface of the wall or support surface. This installation configuration allows an operator or person to efficiently and accurately depress the button 4 to change the water discharge modes of the valve V.

The button 4 is received in a receiving groove 91 in the water dividing plate 9; one end of the switching shaft 1 passes through the guide slot 25 of the switching body 2 (see FIG. 2B) and is disposed in the guide slot of the water dividing plate 9 and is connected with the button 4, and the other end of the switching shaft 1 with oblique teeth 121 for the switching shaft (see FIGS. 3A and 3B) is located in the guide slot 25 of the switching body to allow the switching shaft 1 to move along and within the guide slot 25 of the switching body. The oblique teeth 26 (see FIG. 2A) for the switching body are disposed in the guide slot 25 of the switching body, the oblique teeth 26 for the switching body are cooperated with switching shaft ribs 122, and the oblique teeth 121 for the switching shaft are located on the switching shaft ribs 122 on the switching shaft 1.

Figure 4A:
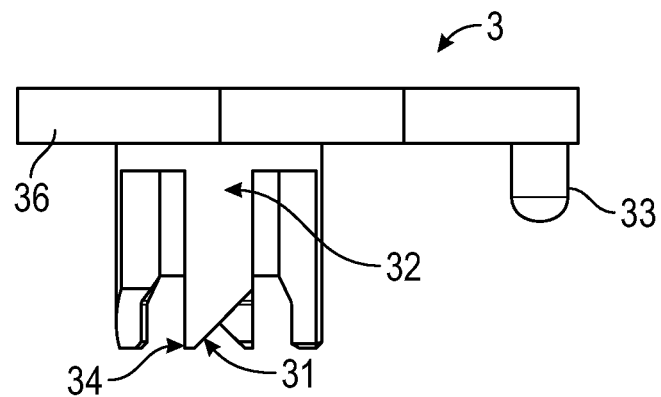
FIGS. 4A and 4B are, respectively, a side view and a bottom view of a switching sheet of the switching assembly of the pipeline valve V.
Figure 4B:
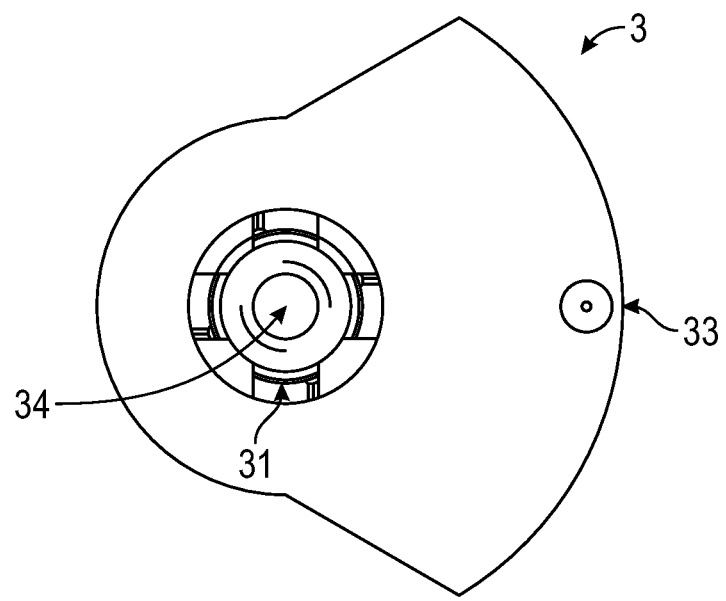

Referring to FIGS. 4A and 4B, the switching member or sheet 3 has switching sheet ribs 32 and oblique teeth 31 associated with the switching ribs 32. When the valve V is assembled, the switching sheet ribs 32 are located in the guide slot 25 of the switching body 2 and move along and within the guide slot 25 of the switching body 2. As shown in FIG. 4A, the arrangement of the ribs 32 defines a receptacle 34 that extends from a main body portion 35 of the switching member or sheet 3. One end of the guide shaft 12 is provided with the first spring 7 and is received in an inner chamber of the switching shaft 1, and the other end of the guide shaft 12 passes through a central hole of the switching sheet 3 and the second spring 8 located below the switching sheet 3 and is installed on a shaft seat 15 at a bottom of the water sealing cover 13.

When the button 4 is pressed down, the button 4 pushes the switching shaft 1 to move downward, and in turn the switching shaft 1 pushes the switching sheet 3 to move downward; when the switching sheet ribs 32 move away from the guide slot 25 of the switching body 2, the oblique teeth 121 for the switching shaft and the oblique teeth 31 for the switching sheet cooperate with each other to rotate the switching sheet 3 by a first predetermined angle (for example, 45°);

Then, when the button 4 is released, the switching shaft 1 and the button 4 are restored to the original state under a spring force of the first spring 7, and the oblique teeth 31 for the switching sheet cooperate with the oblique teeth 26 for the switching body, and the switching sheet 3 is driven to rotate by a second predetermined angle (for example, 45°) under a spring force of the second spring 8, and the switching sheet ribs 32 slide into the guide slot 25 of the switching body, and move along the guide slot 25 of the switching body to the protrusion 33 of the switching sheet 3 to selectively block one of the first water passing hole 51 and the second water passing hole 52.

As described above, the switching sheet 3 is located under the water stopping member 5, a protrusion 33 is provided onto an arm of the switching sheet 3, the protrusion 33 is configured to selectively block one of the first water passing hole 51 and the second water passing hole 52 according to the rotation of the switching assembly 17. When the protrusion 33 blocks the first water passing hole 51, a fluid entering the water inflow chamber 112 from the inlet 111 flows into the second water discharging chamber 24 through a gap between the water stopping member 5 and the switching body 2, but cannot flow into the first water discharging chamber 23, therefore the fluid can only flow out from the second outlet 22; at this time since the fluid flows from the inlet 111 through the overflow hole 58 (see FIGS. 5A, 5B and 5C) into the water receiving chamber 14, there is a pressure difference between the first water discharging chamber 23 and the water receiving chamber 14, so that the water stopping member 5 is cooperated with water stopping ribs 29 on the switching body 2 corresponding to the first water discharging chamber 23 to seal the first water discharging chamber.

Of course, when the protrusion 33 blocks the second water passing hole 52, the fluid entering the water inflow chamber 112 from the inlet 111 flows into the first water discharging chamber 23 through a gap between the water stopping member 5 and the switching body 2, but cannot flow into the second water discharging chamber 24, therefore the fluid can only flow out from the first outlet 21; at this time, since the fluid flows from the inlet 111 through the overflow hole 58 into the water receiving chamber 14, there is a pressure difference between the second water discharging chamber 24 and the water receiving chambers 14, so that the water stopping member 5 is cooperated with water stopping ribs 29 on the switching body 2 corresponding to the second water discharging chamber 24 to seal the second water discharging chamber. It should be noted that, water is taken as an example of fluid in the present disclosure to illustrate the working principle of the pipeline valve according to the present disclosure. Of course, the pipeline valve according to the present disclosure can also be applied to other kinds of fluids.

Next, the switching principle of the present disclosure will be described in connection with different states of the pipeline valve with reference to FIGS. 6A-8. A "state I" is referred to as an initial state, that is, a state in which the water is only discharged from the first outlet 21; a "state II" is a state in which the water is discharged from both the first outlet 21 and the second outlet 22 after the button 4 is pressed once; a "state III" is a state in which the water is only discharged from the second outlet 22 after the button is pressed again (the button 4 is pressed twice relative to the initial state); a "state IV" is a state in which the water is discharged from both the first outlet 21 and the second outlet 22 after the button is pressed once again (the button 4 is pressed three times relative to the initial state).

Figure 6A:
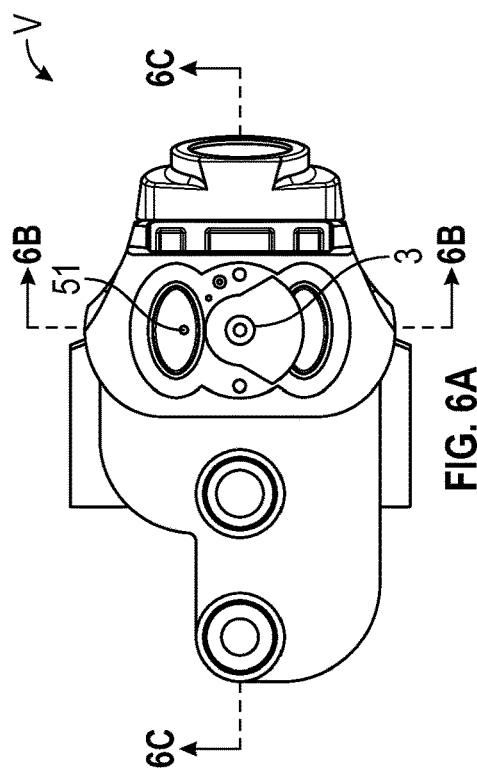
FIG. 6A is a bottom view of the pipeline valve Vin an initial state I ("state I") where a button is not depressed and water is only discharged from a first outlet of the valve V.

Specifically, referring to FIG. 6A, the first water passing hole 51 is not blocked, and after the water enters the water inflow chamber 112, the water urges the first water stopping flange portion 56 to open and flows into the first water discharging chamber 23, thereby causing the water is discharged from the first outlet 21. However, the protrusion (or boss) 33 on the switching sheet 3 blocks the second water passing hole 52, the second water stopping flange portion 57 contacts the water stopping ribs 29 on the switching body 2, and the water flows into the water containing chamber 14 through the overflow hole 58 in the water stopping member 5 on the periphery of the first water stopping flange portion 56 and the second water stopping flange portion 57. At this time, the contact area of the second water stopping flange portion 57 to water at a lower surface thereof is larger than that at an upper surface thereof, thereby it generates a water pressure difference. The second water stopping flange portion 57 and the water stopping ribs 29 of the switching body 2 are in close seal or contact with each other, so that the water cannot enter the second water discharging chamber 24, therefore the water cannot be discharged from the second outlet 22. As shown in the top view at the top right corner of FIG. 6A, the switching sheet 3 is located in the page and extends downward, and the second water passing hole 52 is just blocked by the protrusion 33 thereon.

In conjunction with FIGS. 1A, 1B, 2A, 2B, 3A, and 3B, the switching shaft ribs 122 are placed in the guide slot 25 of the switching body and move along the guide slot 25 of the switching body. The oblique teeth 121 for the switching shaft cooperate with oblique teeth 31 for the switching sheet, and the switching sheet ribs 32 are placed in the guide slot 25 of the switching body and move along the guide slot 25 of the switching body.

Figure 6C:
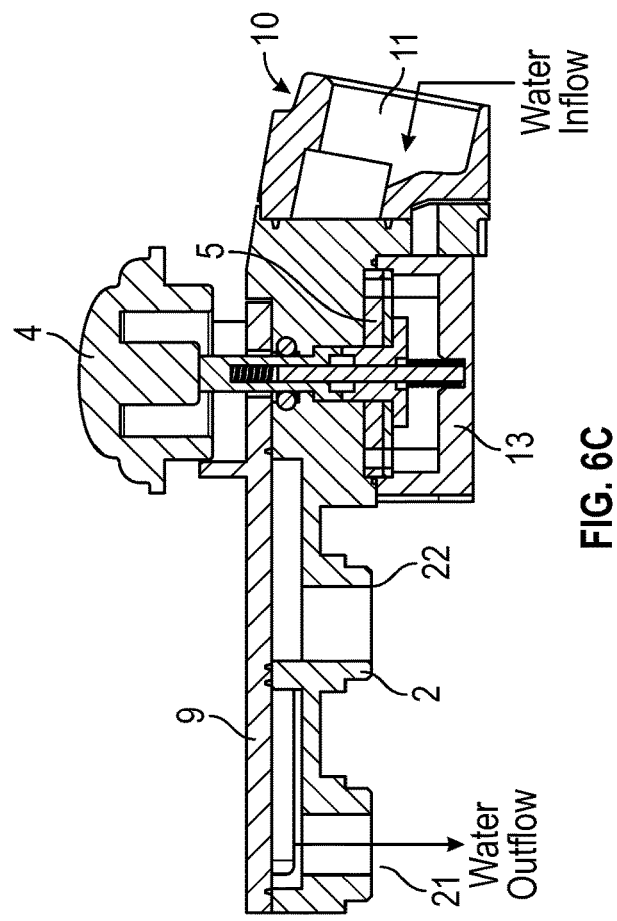
FIG. 6C is a cross-sectional view of the pipeline valve V taken along line 6C in FIG. 6A with the water sealing cover removed, showing the valve V and water flow in the initial state I.
Figure 6B:
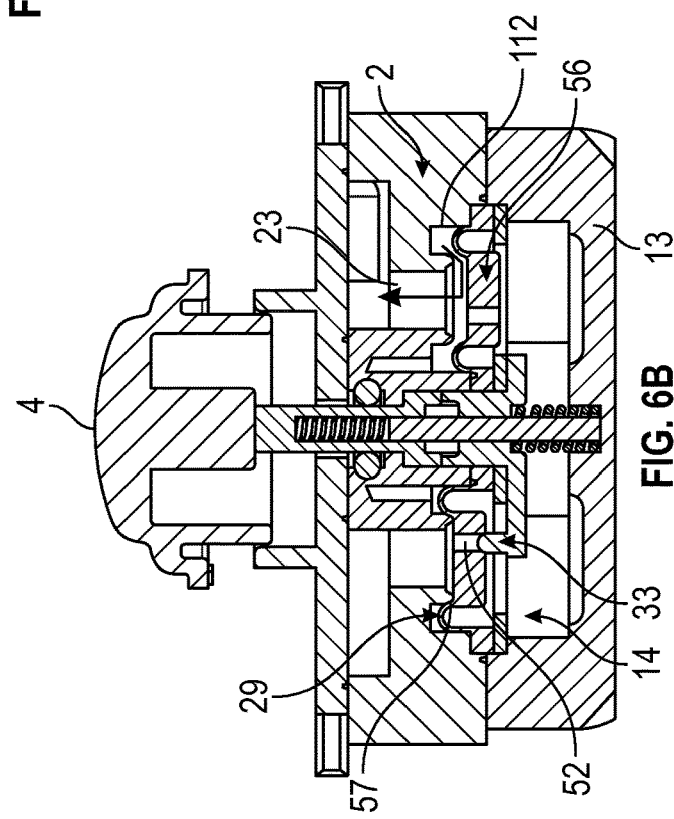
FIG. 6B is a cross-sectional view of the pipeline valve V taken along line 6B in FIG. 6A, showing the valve V in the initial state I.

Referring to FIGS. 6B and 6C, when the button 4 is pressed, the button 4 pushes the switching shaft 1 to move vertically downward, the switching shaft 1 pushes the switching sheet 3 to move vertically downward; when the switching sheet ribs 32 move away from the guide slot 25 of the switching body, the oblique teeth 121 for the switching shaft and the oblique teeth 31 for the switching sheet cooperate with each other to rotate the switching sheet 3 by a certain angle (for example, 45°). At this time, in the page of the corresponding top view, the switching sheet 3 is rotated to the left by 45° relative to the position shown in FIG. 6A.

Referring to FIG. 6D, when the button 4 is released, the switching shaft 1 and the button 4 are restored to the original state under the spring force of the first spring 7. The oblique teeth 31 for the switching sheet cooperate with the oblique teeth 26 for the switching body, and the switching sheet 3 is driven to rotate by a certain angle (for example, 45°) under the spring force of the second spring 8, and the switching sheet ribs 32 slide into the guide slot 25 of the switching body, and move along the guide slot 25 to the protrusion 33 on the switching sheet 3 to block the first receiving hole 53 in the water stopping member 5 (that is, the protrusion 33 on the switching sheet 3 is rotated to the left by 90° relative to the position shown in FIG. 6A in the page of the corresponding top view).

At this time, the first water passing hole 51 is not blocked, and after the water enters the water inflow chamber 112, the water urges the first water stopping flange portion 56 to open and flows into the first water discharging chamber 23, thereby causing the water to be discharged from the first outlet 21. Similarly, the second water passing hole 52 is not blocked, and after the water enters the water inflow chamber 112, the water urges the second water stopping flange portion 57 to open and flows into the second water discharging chamber 24, thereby causing the water to be also discharged from the second outlet 22.

Figure 7A:
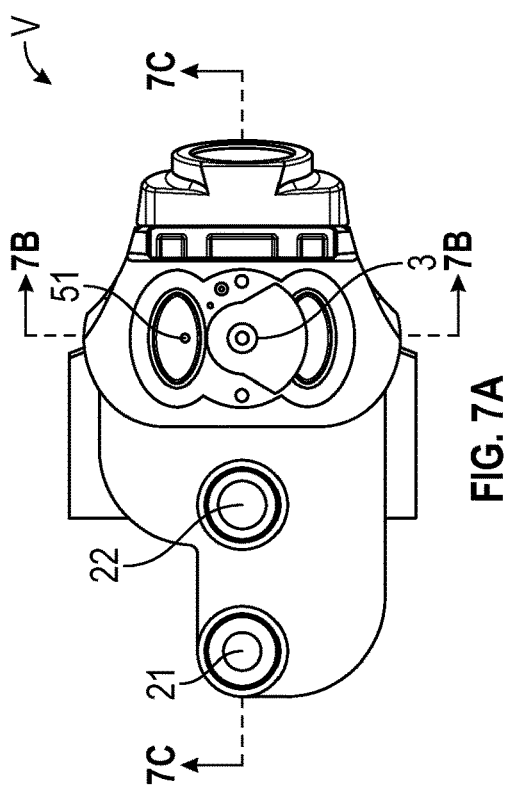
FIG. 7A is a bottom view of the pipeline valve V where the button is pressed as compared to the button in state I shown in FIG. 6A.
Figure 7C:
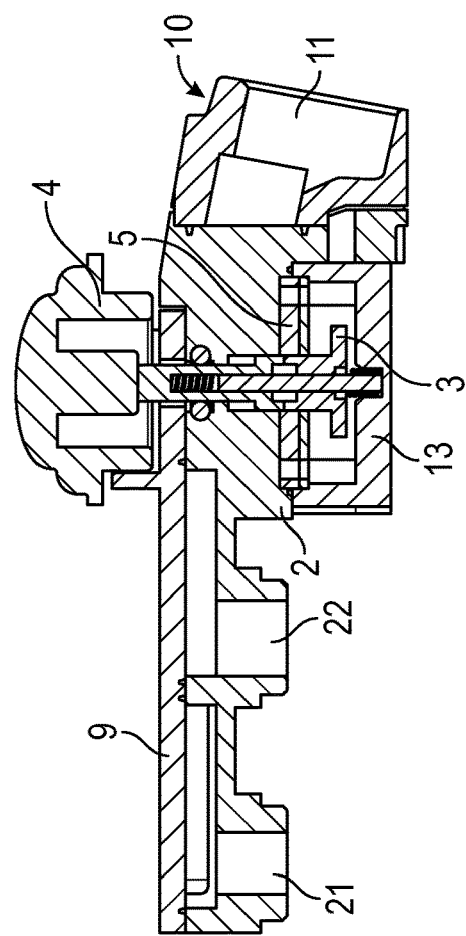
FIG. 7C is a cross-sectional view of the pipeline valve V taken along line 7C in FIG. 7A with the water sealing cover removed.
Figure 7B:
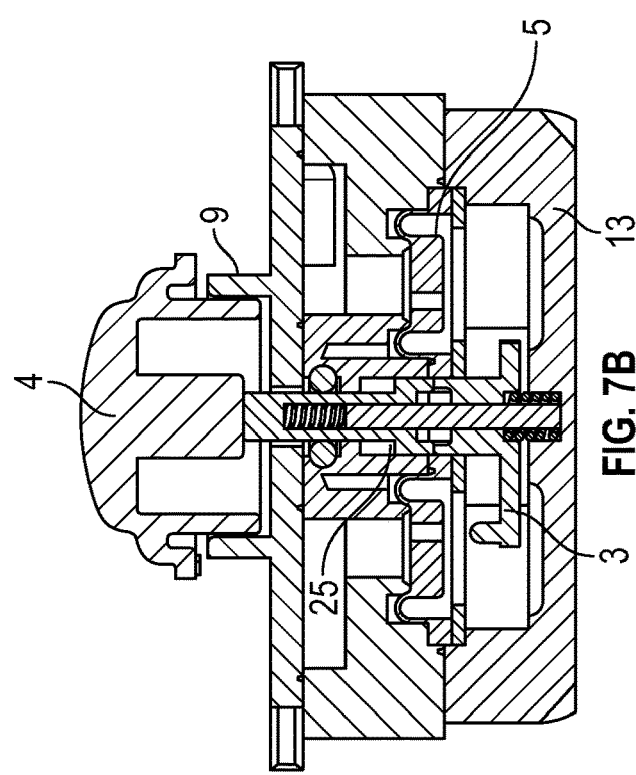
FIG. 7B is a cross-sectional view of the pipeline valve V taken along line 7B in FIG. 7A.

Referring to FIG. 7, the button 4 is pressed again (the button 4 is pressed for the second time), so that the protrusion 33 on the switching sheet 3 is rotated by 90° again, and the protrusion 33 just blocks the first water passing hole 51. Similar to the initial state, this will cause the water to pass through the second water discharging chamber 24 and cause the water to be discharged from the second outlet 22, but no water is discharged from the first outlet 21.

Figure 8A:
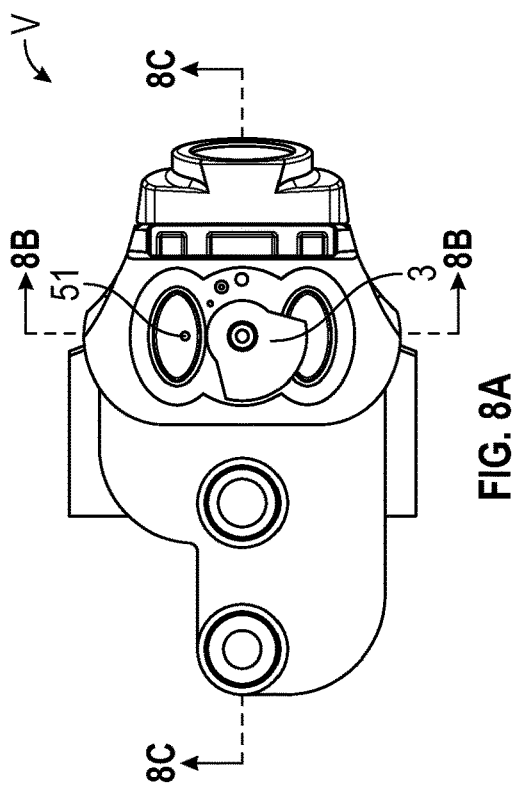
FIG. 8A is a bottom view of the pipeline valve V with the button being pressed and a switching component rotating a switching sheet by 45° as compared to angles in the state I shown in FIG. 6A.
Figure 8C:
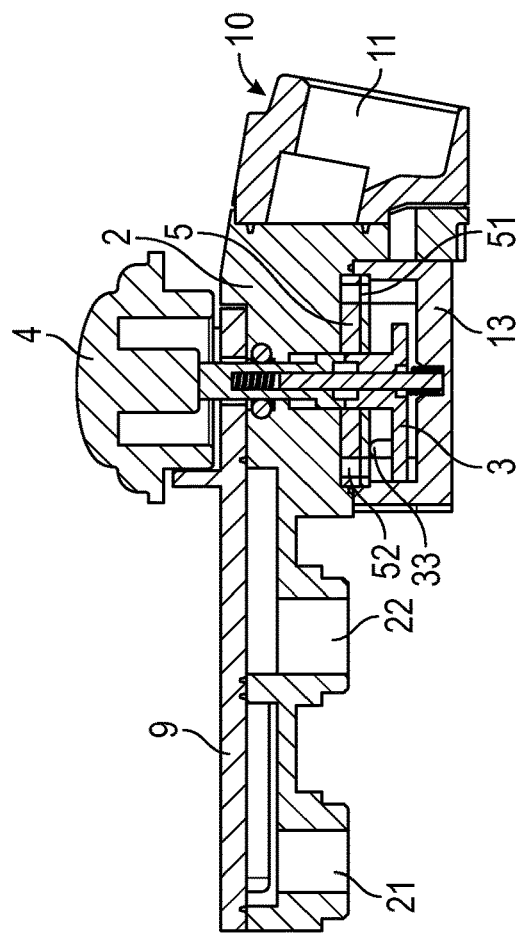
FIG. 8C is a cross-sectional view of the pipeline valve V taken along line 8C in FIG. 8A with the water sealing cover removed.
Figure 8B:
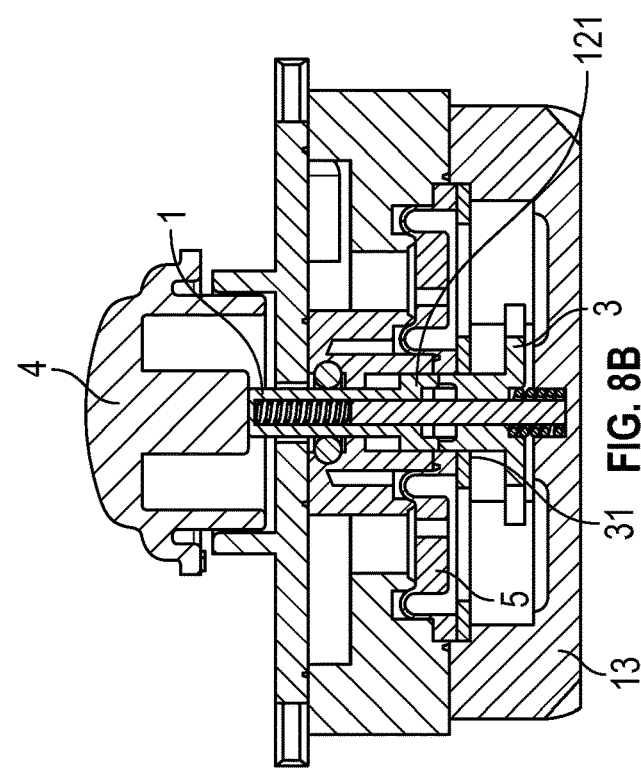
FIG. 8B is a cross-sectional view of the pipeline valve V taken along line 8B in FIG. 8A.
Figure 9A:
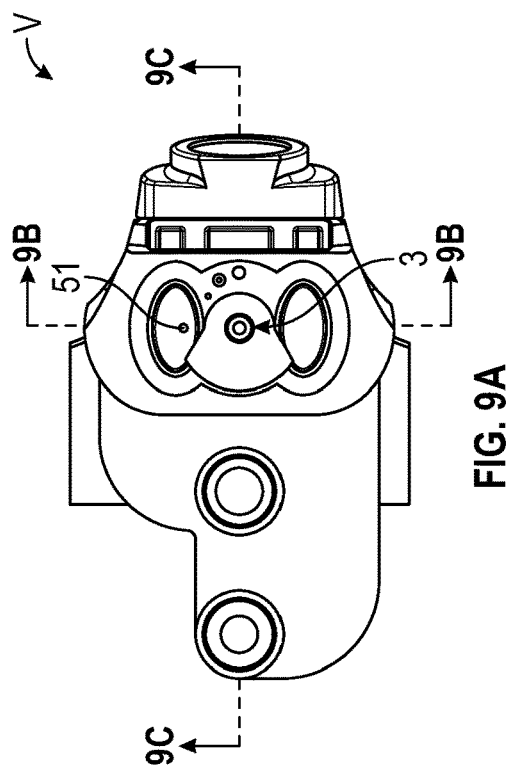
FIG. 9A is a bottom view of the pipeline valve V with the button being released and the switching component rotating the switching sheet again by 45° as compared to angles in the state I shown in FIG. 6C.
Figure 9C:
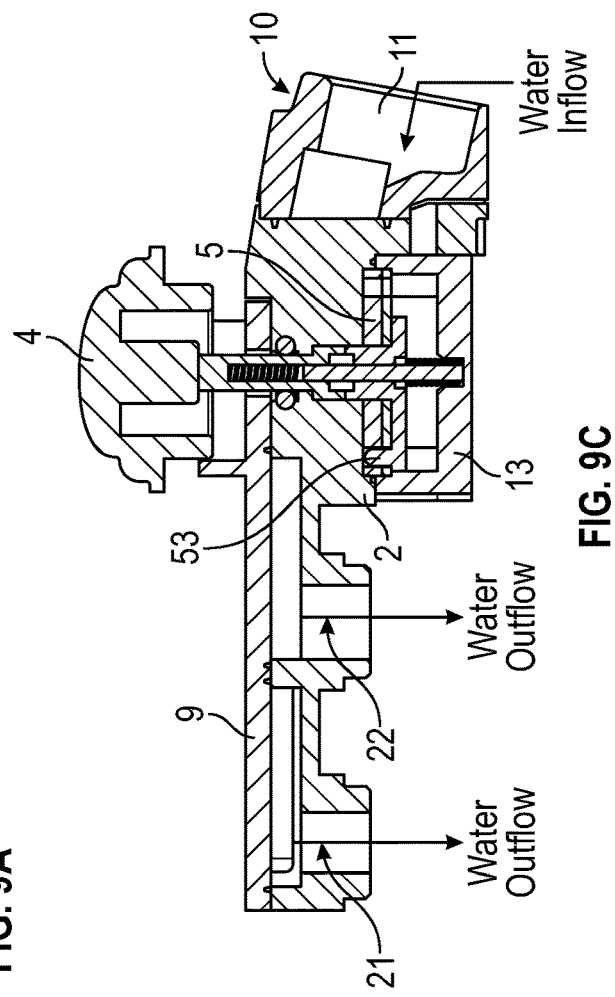
FIG. 9C is a cross-sectional view of the pipeline valve V taken along line 9C in FIG. 9A with the water sealing cover removed, showing water be discharged through a first outlet and a second outlet.
Figure 9B:
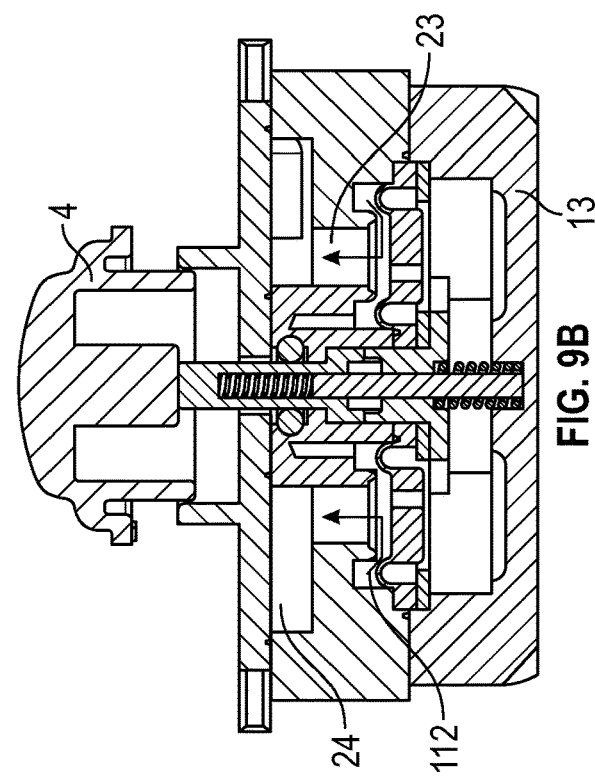
FIG. 9B is a cross-sectional view of the pipeline valve V taken along line 9B in FIG. 9A.

Referring to FIG. 8, the button 4 is pressed again (the button 4 is pressed for the third time), so that the protrusion 33 on the switching sheet 3 is rotated by 90° again, the protrusion 33 is just housed in the second receiving hole 54 on the water stopping member 5. Similar to the state II, at this time, since the protrusion 33 does not block the first water passing hole 51 and the second water passing hole 52, the water is discharged from both the first outlet 21 and the second outlet 22.

It should be noted that, in the embodiments of the present disclosure, the water stopping pad is provided with a first water stopping flange portion at a portion thereof corresponding to the first water discharging chamber and a second water stopping flange portion at a portion thereof corresponding to the second water discharging chamber, the first water passing hole is located at a region surrounded by the first water stopping flange portion, and the second water passing hole is located at a region surrounded by the second water stopping flange portion. However, it is also possible to provide, as needed, water receiving holes angled by other angles or a plurality of protrusions, so that the water is not discharged from the first outlet and the second outlet in a certain state. In view of the above, they can be obtained based on the disclosure of the present disclosure without any creative effort, and therefore they will not be discussed in detail herein. In the pipeline valve V for closing and/or switching according to the present disclosure, it can achieve the switch of the water discharging states between the first outlet and/or the second outlet by applying a small force, by means of the cooperation of the switching assembly 17 with the water stopping member.

FIGS. 12-21 show a second embodiment of the pipeline valve V2 for closing and/or switching according to an embodiment of the present disclosure includes a valve body, an inlet, an outlet, a water stopping member, a plugging assembly 19 and a switching assembly 17. In this example, the valve body assembly includes an upper cover body 21', an upper valve body 215 and a lower valve body 25' which are fitted to each other. In one example, the upper valve body 215 and the lower valve body 25' are connected by a fixing member, for example, a bolt 214.

Figure 15B:
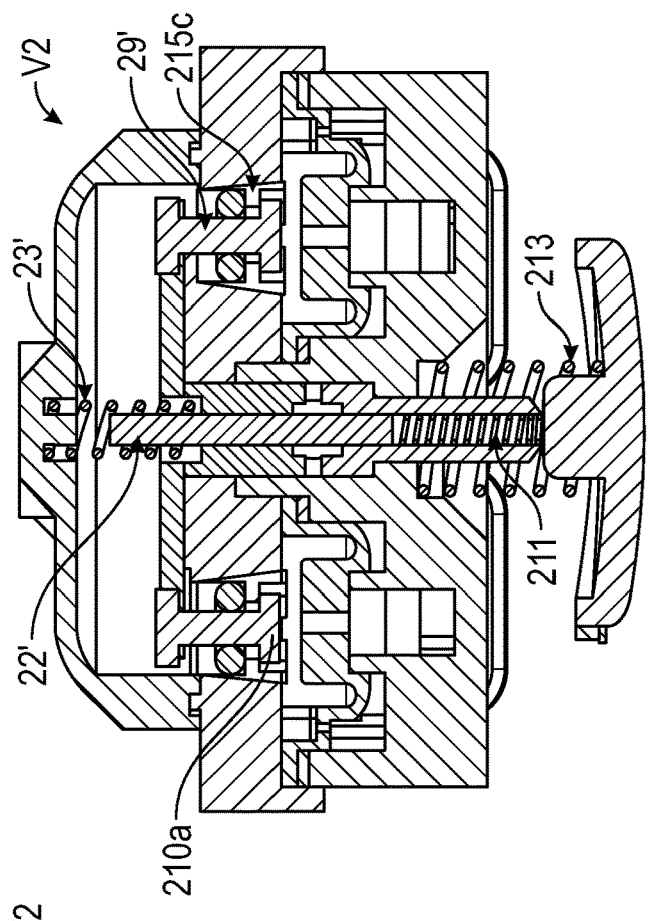
FIG. 15B is a cross-sectional view of the pipeline valve V2 in state II and taken along line 15B in FIG. 15A.
Figure 15A:
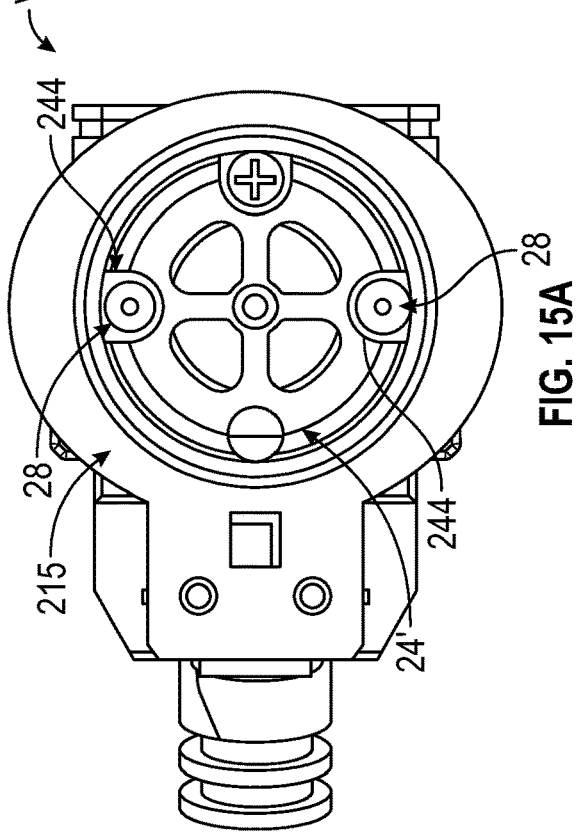
FIG. 15A is a top view of the pipeline valve V2 in a subsequent state II ("state II"), wherein water is discharged from both a first outlet and a second outlet after a button of the valve V2 is depressed once.
Figure 15C:
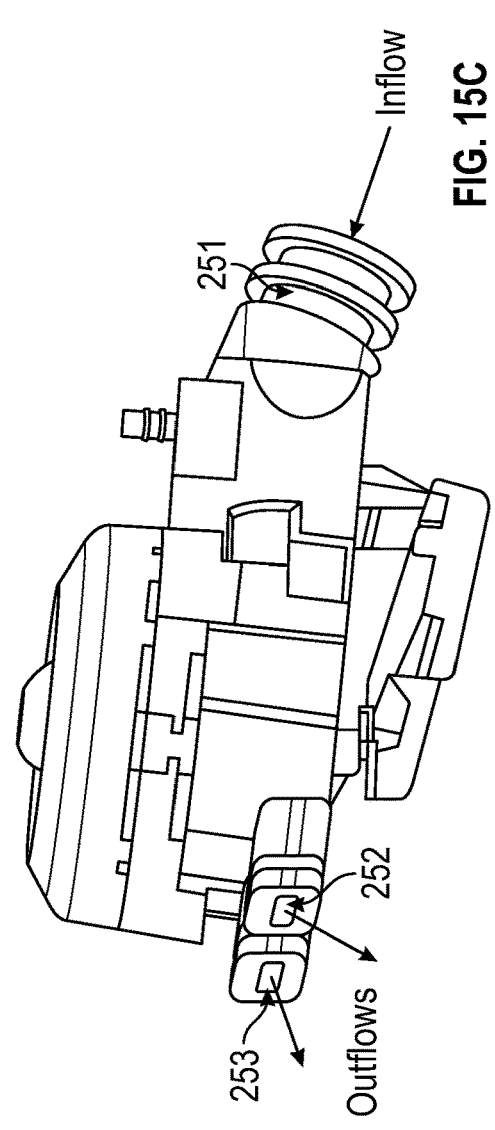
FIG. 15C is a side view of the pipeline valve V2 in state II.

Referring to FIGS. 14 and 15, a right end of the lower valve body 25' is provided as an inlet 251. Correspondingly, a first outlet 252 and a second outlet 253 are sequentially provided at a left end of the lower valve body 25', and the first outlet 252 and the second outlet 253 are respectively communicated with a water receiving chamber (to be described in detail below) of the valve body. It should be noted that, in this example, one inlet and two outlets are taken as an example to illustrate the design concept of the present disclosure, but it should be understood that the number of them may be adjusted by those skilled in the art according to actual needs, and it is not limited to the example illustrated herein.

Figure 13:
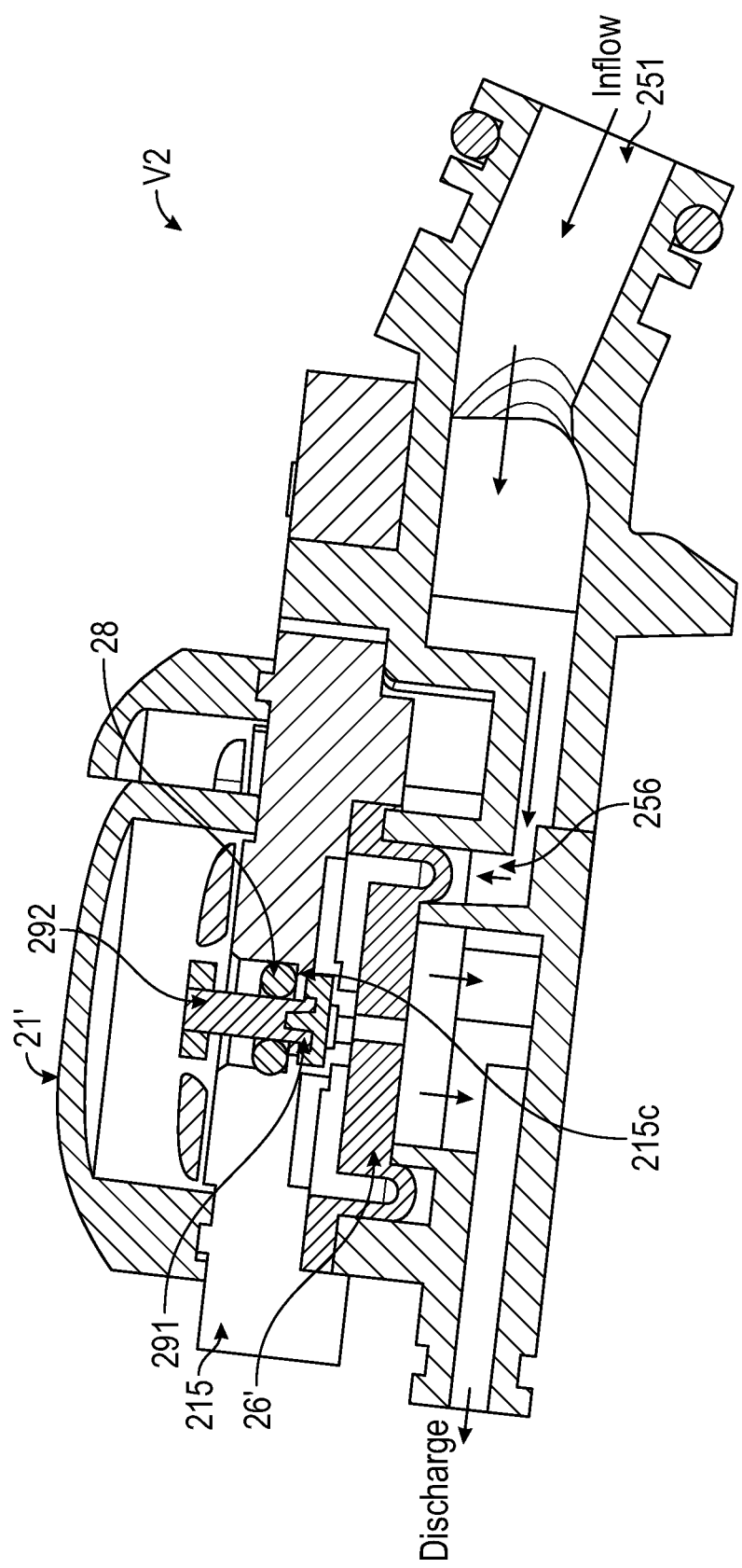
FIG. 13 is a cross-sectional structural view of the pipeline valve V2, showing water flow through the valve V2.

With reference to FIGS. 13-15, corresponding to the first outlet 252 and the second outlet 253, a first water discharging chamber 254 and a second water discharging chamber 255 are provided on a middle portion of the lower valve body 25', and a water inflow chamber 256 is provided at a peripheral portion of the lower valve body, the first water discharging chamber 254 and the second water discharging chamber 255 are closed by the water stopping member 26' and the plugging assembly 19 which cooperate with each other. The inlet 251 communicates with the water inflow chamber 256 of the lower valve body 25' and the water receiving chamber (which will be described in detail below) of the valve body in order, and the communication/blocking of the inlet to/from the first water discharging chamber 254 and the second water discharging chamber 255 is realized via the water stopping member 26'.

The upper valve body 215 and the upper cover body 21' are sequentially disposed above the water stopping member 26', and a space between the upper valve body 215 and the water stopping member 26' functions as a water receiving chamber 261. The water receiving chamber 261 is also sealed by the upper valve body 215, the plugging assembly 19 and the water stopping member 26', i.e., the water receiving chamber 261 is sealed by closing the water stopping member 26' with the upper valve body 215 and the plugging assembly 19 (for example, from the upper portion thereof), thereby the communication/blocking of the water stopping member 26' to/from the first water discharging chamber 254 and the second water discharging chamber 255, and the communication/blocking to/from the water inflow chamber 256 are realized. In fact, the purpose of providing the water stopping member 26' in a chamber of the valve body is mainly to prevent direct communication between the inlet 251 and the first outlet 252 and the second outlet 253, so that a selective communication between them may be achieved by the switching assembly 17 described later.

The switching assembly 17 is configured to allow the plugging assembly 19 to block corresponding water passing holes 262, 263 in the water stopping member 26' by rotation of the switching assembly 17, so as to close the communication of the inlet 251 with the first outlet 252 and the second outlet 253 and/or switch between the first outlet 252 and the second outlet 253. In order to achieve closing the first outlet 252 and the second outlet 253 or switching between the first outlet 252 and the second outlet 253, the water passing holes in the water stopping member 26' includes a first water passing hole 262 in communication with the first water discharging chamber 254 and a second water passing hole 263 in communication with the second water discharging chamber 255, when assembled into the valve body assembly. It can be understood that the number of the water passing holes in the water stopping member 26' is generally set to be identical to the number of the water discharging chambers, and the size of the water passing holes may be set according to actual needs.

Figure 16B:
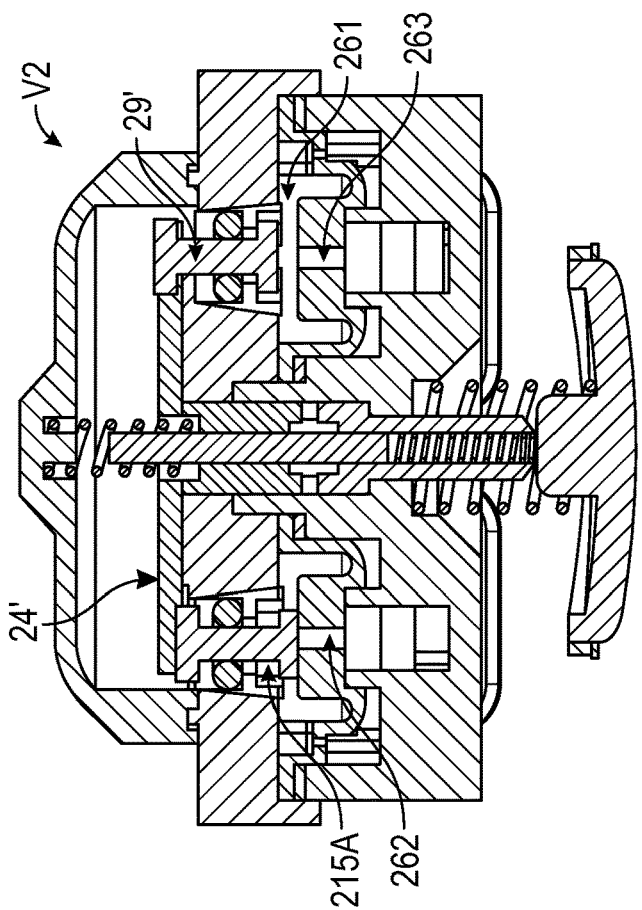
FIG. 16B is a cross-sectional view of the pipeline valve V2 in state III and taken along line 16B in FIG. 16A.
Figure 16A:
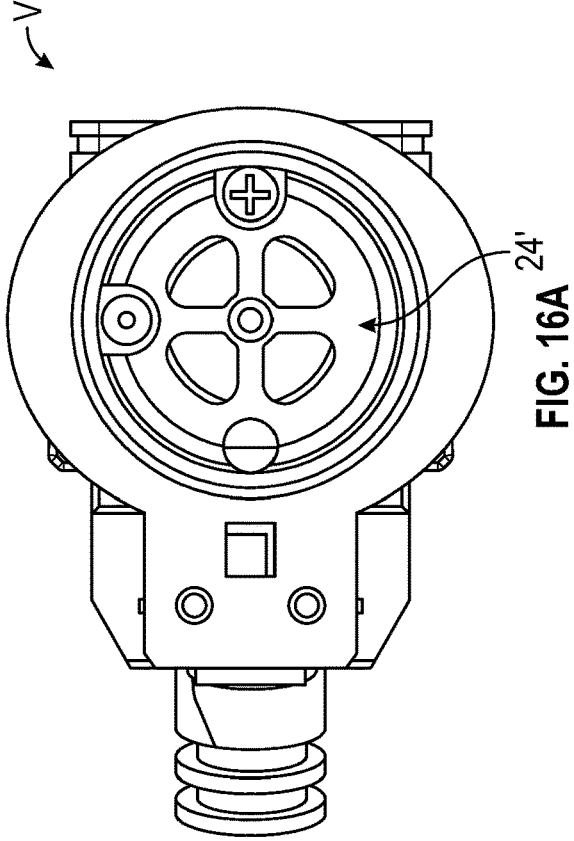
FIG. 16A is a top view of the pipeline valve V2 in a subsequent state III ("state III"), wherein water is discharged from only the second outlet after the button is depressed twice relative to the initial state I.
Figure 16C:
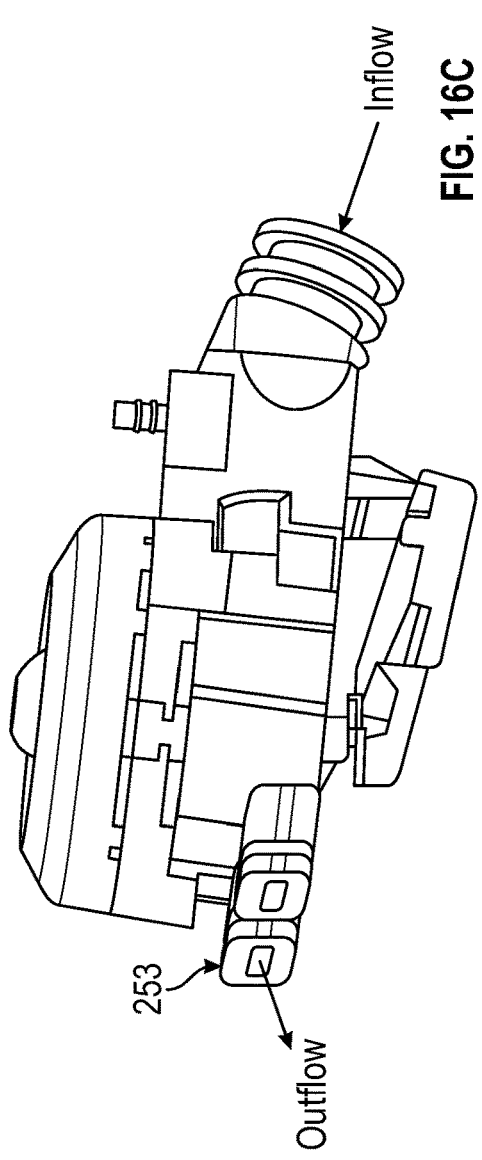
FIG. 16C is a side view of the pipeline valve V2 in state III.

In addition, specifically referring to FIG. 16, the water stopping member 26' is provided with at least one overflow hole 264 (as shown in the figure, two overflow holes 264 are shown) in addition to the first water passing hole 262 and the second water passing hole 263, to achieve the communication between the water inflow chamber 256 and the water receiving chamber 261.

In one example, the water stopping member 26' is a water stopping pad made of an elastic material, and includes a body and a first water stopping flange portion 265 and a second water stopping flange portion 266 disposed on the body. The first water stopping flange portion 265 is provided corresponding to the first water discharging chamber 254 and the second water stopping flange portion 266 is provided corresponding to the second water discharging chamber 255, and the first water passing hole 262 is located at a region surrounded by the first water stopping flange portion 265 and the second water passing hole 263 is located at a region surrounded by the second water stopping flange portion 266. As shown in FIG. 13 and FIG. 16, at least a portion of the first water stopping flange portion 265 and the second water stopping flange portion 266 are housed in water stopping ribs 257 of the lower valve body 25' (see FIG. 11), so as to allow the water stopping member 26' to push the corresponding first water stopping flange portion 265 and/or second water stopping flange portion 266 upward, when a larger water pressure from the water receiving chambers 254, 255 is applied to the water stopping member 26'. Meanwhile, the first water stopping flange portion 265 and/or the second water stopping flange portion 266 cooperate(s) with the water stopping ribs 257 on the lower valve body 25' to achieve sealing the first water discharging chamber 254 and/or the second water discharging chamber 255 accordingly.

It should be noted that, the size of the first water stopping flange portion and the second water stopping flange portion, and the number and size of the first receiving hole, the second receiving hole, and the like can be set according to actual needs.

In addition, it should be noted that, referring to FIG. 16, the body is further provided with mounting and positioning holes (not shown) in a region outside the region surrounded by the first water stopping flange portion 265 and the second water stopping flange portion 266, to facilitate the mounting and positioning. They will not be discussed in detail herein.

Figure 12:
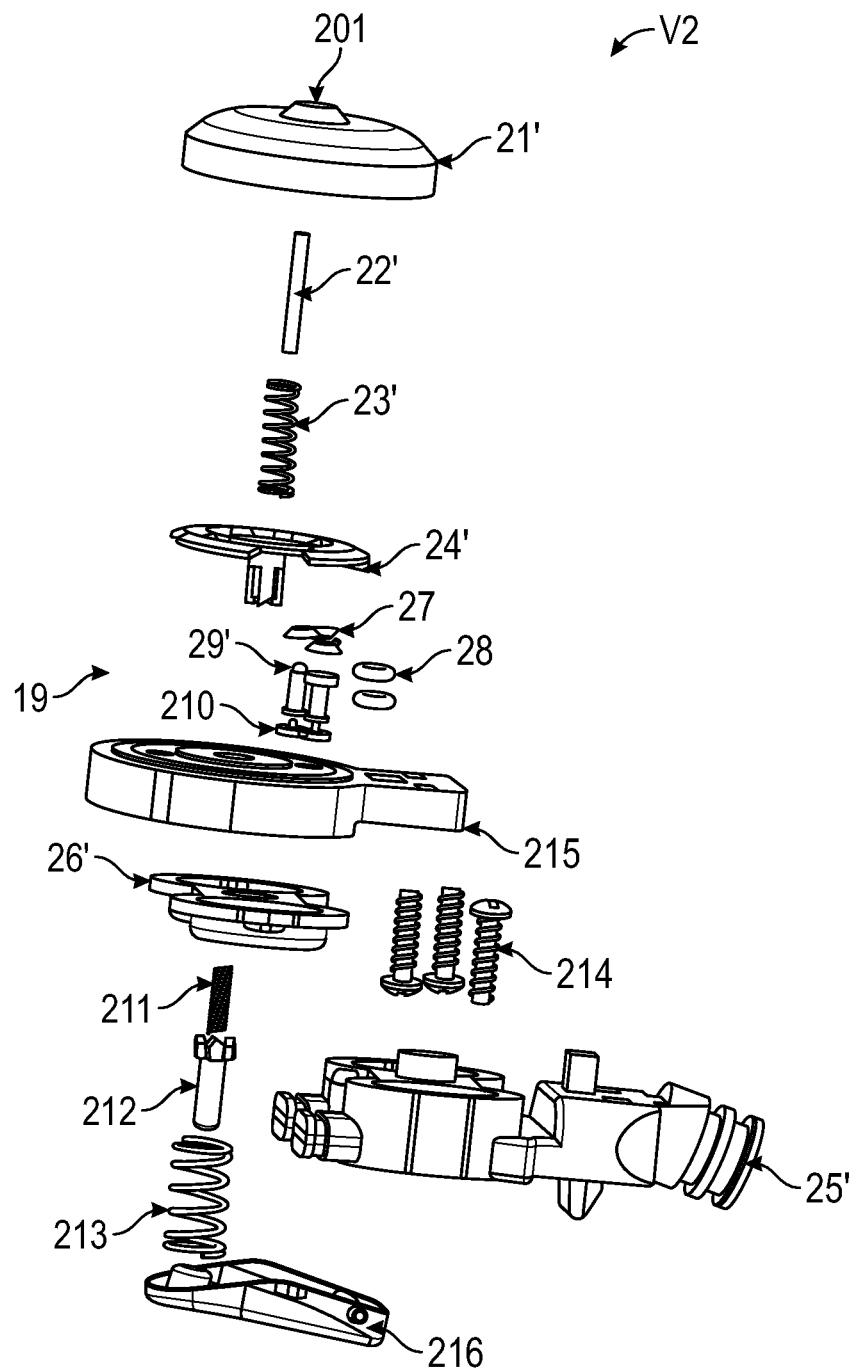
FIG. 12 is an exploded view of a pipeline valve V2 according to a second embodiment of the present disclosure.

As shown in FIG. 12, the switching assembly 17 includes a switching shaft 212, a first spring 211, the rotatable disc 24', a guide shaft 22', a second spring 23', a third spring 213, and a button 216. As shown in FIG. 14, the upper valve body 215 is provided with a first receiving hole 215a and a second receiving hole 215b for receiving respective plugging assemblies, and the first receiving hole 215a is provided corresponding to the first passing hole 262 on the water stopping member 26' and the second receiving hole 215b is provided corresponding to the second water passing hole 263 on the water stopping member 26'. A space corresponding to the first receiving hole 215a and the second receiving hole 215b between the upper valve body 215 and the water stopping member 26' forms the water receiving chamber.

It should be noted that, the number, shape, and size of the receiving holes may be designed as required. Preferably, the number, shape, and size of the receiving holes are the same as the number, shape, and size of the water passing holes on the water stopping member.

In order to install the switching assembly 17 in the valve body, each of the upper valve body 215, the lower valve body 25' and the water stopping member 26' is provided with a guide slot at its center (as shown in FIG. 14, each of them is provided with a guide slot, but for the sake of simplicity of illustration, only the guide slots 258 and 267 on, respectively, the lower valve body 25' and the water stopping member 26' are shown (see FIG. 19)).

The button 216 is received in a receiving groove (not shown) in the lower valve body 25'; one end of the switching shaft 212 passes through the guide slot 258 of the lower valve body 25' (see FIG. 18) and is inserted into the third spring 213 (it should be noted that the third spring 213 may be omitted without affecting the operation of the button 216) and then connected with the button, and the other end of the switching shaft 212 with oblique teeth 212a for the switching shaft (see FIG. 18A) is located in the guide slot 258 of the lower valve body 25' to allow the switching shaft 212 to move along the guide slot 258 of the lower valve body.

Figure 18C:
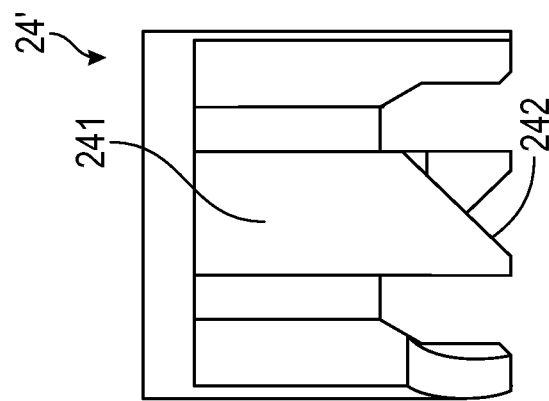
FIG. 18C is a side view of a rotatable disc of the of the pipeline valve V2, showing the disc having rotatable disc ribs and oblique teeth.
Figure 18B:
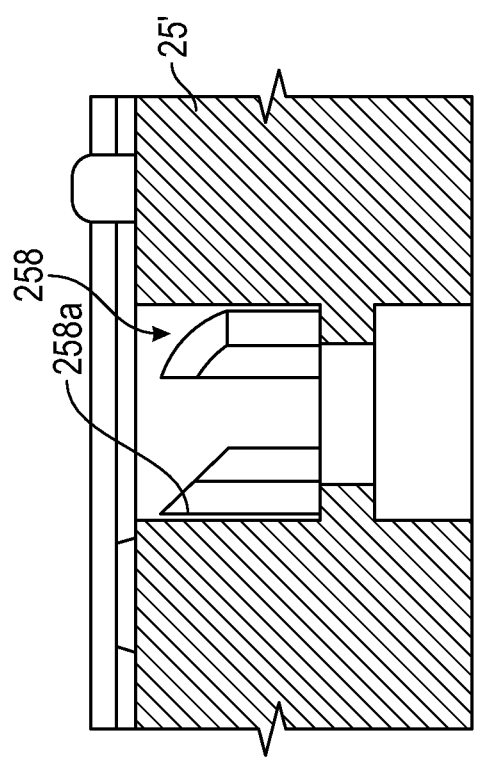
FIG. 18B is a partial cross-sectional view of a lower valve body of the pipeline valve V2, showing a guide slot with internal oblique teeth.
Figure 18A:
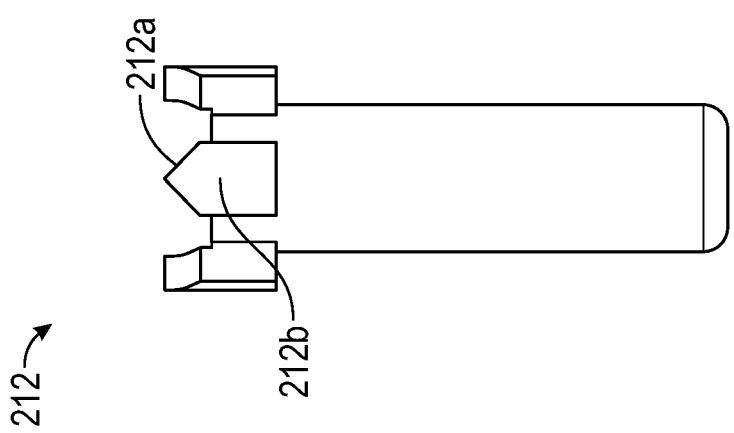
FIG. 18A is a side view of a switching shaft of the pipeline valve V2.

Referring to FIGS. 18B and 18C, oblique teeth 258a for the lower valve body 25' are disposed in the guide slot 258 of the lower valve body, the oblique teeth 258a for the lower valve body 25' are cooperated with switching shaft ribs 212b, and the oblique teeth 212a for the switching shaft are located on the switching shaft ribs 212b on the switching shaft 212.

Figure 20C:
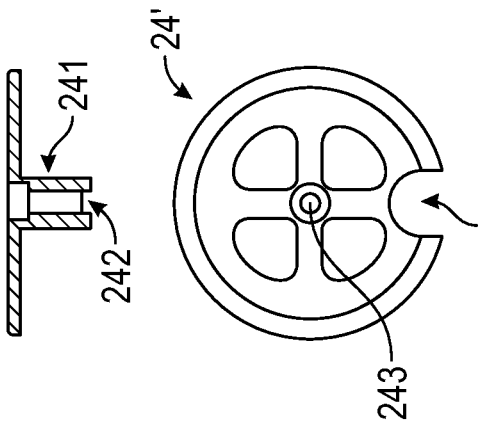
FIG. 20C is a cross-sectional view and a plan view of a third embodiment of the rotatable disc, showing the disc having one switching hole.
Figure 20B:
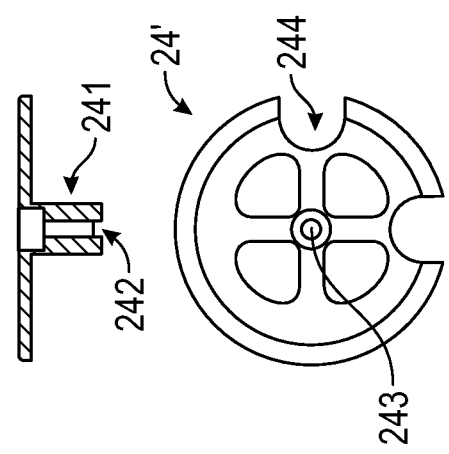
FIG. 20B is a cross-sectional view and a plan view of a second embodiment of the rotatable disc, showing the disc having two switching holes.
Figure 20A:
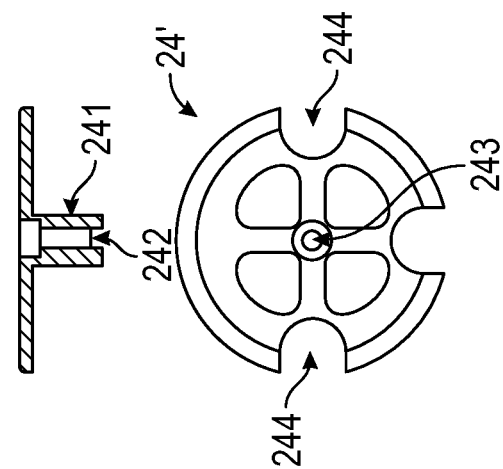
FIG. 20A is a cross-sectional view and a plan view of a first embodiment of a first embodiment of a rotatable disc positioned above an upper valve body in the pipeline valve V2, showing the disc having three switching holes.

Referring to FIGS. 14 and 20, the rotatable disc 24' has rotatable disc ribs 241 and oblique teeth 242 for the rotatable disc on the rotatable disc ribs, the rotatable disc ribs 241 are located in the guide slots of the upper valve body 215 and the lower valve body 25' and move along the guide slots of the upper valve body 215 and the lower valve body 25', and one end of the guide slot 258 of the lower valve body 25' facing away from the button 216 is inserted into the guide slot of the upper valve body 215.

As shown in FIGS. 12 and 14, one end of the guide shaft 22' is provided with the first spring 211 and is received in an inner chamber of the switching shaft 212, and the other end of the guide shaft 22' passes through a central hole 243 (see FIG. 20) of the rotatable disc 24' and the second spring 23' located above the rotatable disc and then is installed on a shaft seat 201 at a top of the upper cover body 21'.

When the button 216 is pressed down, the button 216 pushes the switching shaft 212 to move upward, and the switching shaft 212 pushes the rotatable disc 24' to move upward; when the rotatable disc ribs 241 move away from the guide slot 258 of the lower valve body 25', the oblique teeth 212a for the switching shaft and the oblique teeth 242 for the rotatable disc cooperate with each other to rotate the rotatable disc by a first predetermined angle (for example, 90°).

Then, when the button 216 is released, the switching shaft 212 and the button 216 are restored to an original state under a spring force of the first spring 212, and the oblique teeth 242 for the rotatable disc cooperate with the oblique teeth 258a for the lower valve body, and the rotatable disc 24' is driven to rotate by a second predetermined angle (for example, 90°) under a spring force of the second spring 23', and the rotatable disc ribs 241 slide into the guide slot 258 of the lower valve body, and move along the guide slot 258 of the lower valve body 25' until a switching hole (to be described in detail below) of the rotatable disc selectively receives the plugging assembly 19 (to be described in detail below) in the first receiving hole 215a and the second receiving hole 215b.

As described above, the rotatable disc 24' is located above the upper valve body 215, and three switching holes 244 are provided in the rotatable disc 24'. The three switching holes are located on the same circumference centered on a center hole 243 of the rotatable disc, adjacent to each other and spaced apart by 90°. The three switching holes 244 are configured to selectively release or receive the plugging assembly 19 (to be described below) in any one of the first receiving hole 215a and the second receiving hole 215b according to the rotation of the rotatable disc.

Figure 17B:
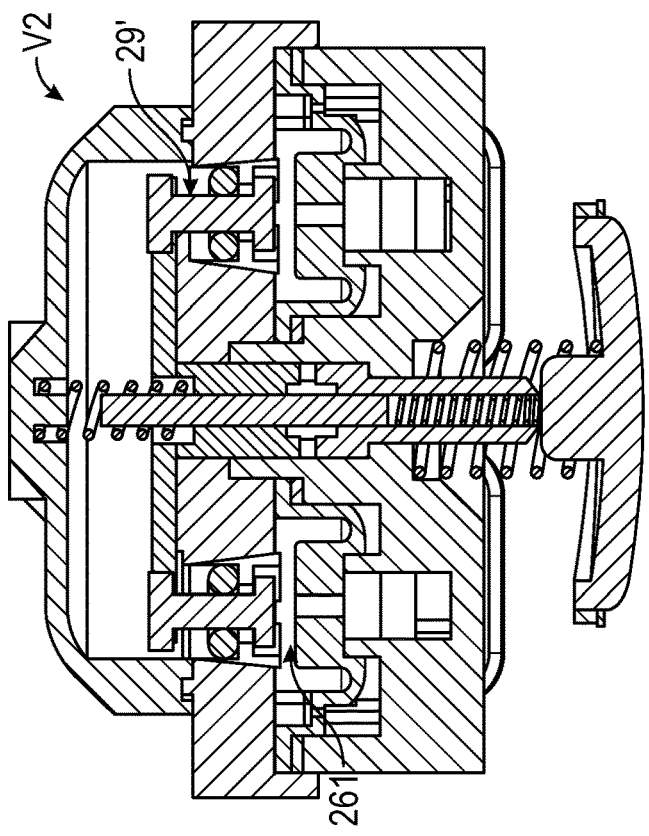
FIG. 17B is a cross-sectional view of the pipeline valve V2 in state IV and taken along line 17B in FIG. 17A.
Figure 17A:
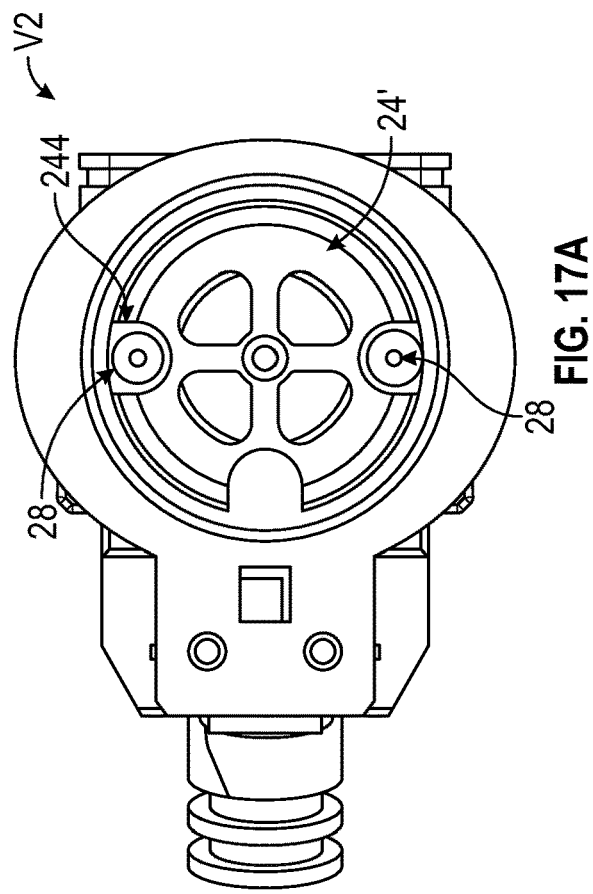
FIG. 17A is a top view of the pipeline valve V2 in a subsequent state IV ("state IV"), wherein water is discharged from both the first outlet and the second outlet after the button is depressed three times relative to the initial state I.
Figure 17C:
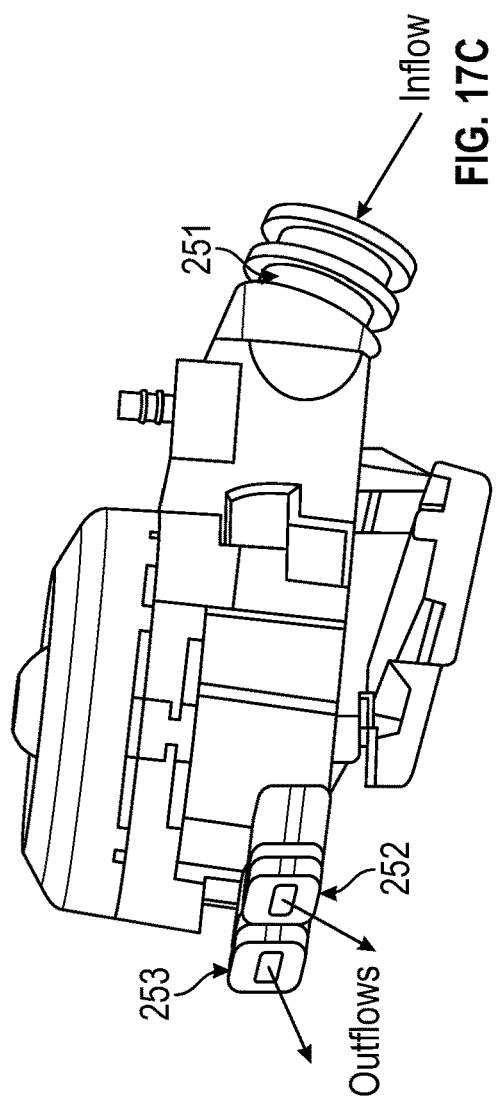
FIG. 17C is a side view of the pipeline valve V2 in state IV.

In this example, three switching holes are taken as an example to explain the design concept of the present disclosure. However, it can be understood that those skilled in the art may set the number of them according to actual needs. For example, one or two switching holes may be provided (as shown in FIG. 17), and the present disclosure is not limited to the example here.

With reference to FIG. 12 to FIG. 14, the first receiving hole 215a and the second receiving hole 215b of the upper valve body 215 are each provided with a plugging assembly 19, and the structure and function of the plugging assembly 19 in the first receiving hole 215a are the same as those of the plugging assembly 19 of the second receiving hole 215b, and the structure and function of the first receiving hole 215a are the same as those of the second receiving hole 215b. Therefore, only the first receiving hole 215a and the plugging assembly 19 therein are taken as an example to describe, and the second receiving hole 215b and the plugging assembly 19 therein will not be repeatedly described here.

It should be noted that the number, shape, and size of the plugging assemblies correspond to the number, shape, and size of the receiving holes of the upper valve body, as long as the plugging assemblies can be moved up and down in the receiving holes and the receiving holes can be sealed.

The plugging assembly 19 comprises a seal shaft 29' passing through the first receiving hole 215a, a seal body 210 at a first end of the seal shaft 29', a seal ring 28 at a second end of the seal shaft 29', and a spring 27 located on the seal shaft 29'. The first end and the second end of the seal shaft 29' are opposite ends of the seal shaft 29'.

A ring-shaped protrusion 215c is provided in the first receiving hole 215a of the upper valve body 215, a protruding portion 291 is provided at an end of the seal shaft 29' connected with the seal body 210, the protruding portion 291 protrudes outward under the protrusion 215c, to at least partially abut against the protrusion 215c, and the seal ring 28 and the spring 27 are sequentially disposed on a side of the protrusion 215c facing away from the protruding portion 291.

A groove is provided at a center of a first end of the seal shaft 29', a convex 210a is provided in a middle portion of the seal body 210 so that the seal body 210 has a substantially epsilon-shaped "E" cross section. The convex 210a is received in the groove, and a peripheral portion of the seal body 210 surrounds the protruding portion 291 and is flush with a surface of the protruding portion 291. That is, a surface of the protruding portion 291 at a side close to the protrusion 215c is flush with protrusions on both sides of the epsilon-shaped seal body 210.

Figure 21B:
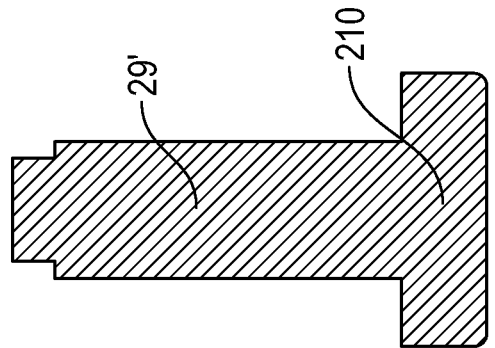
FIG. 21A is a cross-sectional view of a first embodiment of a seal body and a seal shaft of the in the pipeline valve V2; and, FIG. 21B is a cross-sectional view of a first embodiment of a seal body and a seal shaft of the in the pipeline valve V2.
Figure 21A:
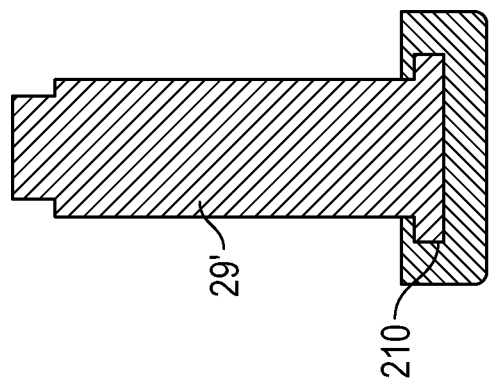

It should be noted that the seal shaft 29' and the seal body 210 may be two independent components as shown in FIG. 21A, or alternatively, they may also be an integrally formed component as shown in FIG. 21B. It may be designed by those skilled in the art as required.

A hole with one step is provided at a center of the seal ring 28, a protruding head 292 with one step is provided at a second end of the seal shaft, and the protruding head 292 is fitted into the hole of the seal ring 28. It should be appreciated by those skilled in the art that the hole of the seal ring 28 may alternatively be provided with two or three steps, and the protruding head at the second end of the seal shaft may accordingly be provided with two or three steps. It may be designed by those skilled in the art as required.

When the plugging assembly 19 only blocks the first water passing hole 262, a fluid entering the water inflow chamber 256 from the inlet 251 flows into the second water discharging chamber 255 through a gap between the water stopping member 26' and the lower valve body 25', but not flows into the first water discharging chamber 254, therefore the fluid can only flow out from a second outlet 253; at this time, since the fluid flows into the water receiving chamber 261 from an overflow hole 264 in the water stopping member, there is a pressure difference between the first water discharging chamber 254 and the water receiving chamber 261, so that the water stopping member 26' is cooperated with water stopping ribs 257 on the lower valve body 25' corresponding to the first water discharging chamber 254 to seal the first water discharging chamber.

Of course, when the plugging assembly 19 only blocks the second water passing hole 263, a fluid entering the water inflow chamber 256 from the inlet 251 flows into the first water discharging chamber 254 through a gap between the water stopping member 26' and the lower valve body 25', but not flows into the second water discharging chamber 255, therefore the fluid can only flow out from a first outlet 252; at this time, since the fluid flows into the water receiving chamber 261 from an overflow hole 264 in the water stopping member 26', there is a pressure difference between the second water discharging chamber 255 and the water receiving chamber 261, so that the water stopping member 26' is cooperated with water stopping ribs 257 on the lower valve body 25' corresponding to the second water discharging chamber 255 to seal the second water discharging chamber. It should be noted that, water is taken as an example of fluid in the present disclosure to illustrate the working principle of the pipeline valve V2 according to the present disclosure. Of course, the pipeline valve V2 according to the present disclosure can also be applied to other kinds of fluids.

Next, the switching principle of the present disclosure will be described in connection with different states of the pipeline valve V2 with reference to FIGS. 13-16. A state I is referred to as an initial state, that is, a state in which the water is only discharged from the first outlet 252; a state II is a state in which the water is discharged from both the first outlet 252 and the second outlet 253 after the button 216 is pressed down once; a state III is a state in which the water is only discharged from the second outlet 253 after the button 216 is pressed down again (the button 216 is pressed twice relative to the initial state or an original state); a state IV is a state in which the water is discharged from both the first outlet 252 and the second outlet 253 after the button is pressed once again (the button 216 is pressed three times relative to the initial state).

Specifically, referring to FIG. 11, the plugging assembly 19 in the first receiving hole 215*a* is received in the switching hole 244 of the rotatable disc 24', so that the plugging assembly 19 leaves the first water passing hole 262, and thus the first water passing hole 262 is not blocked by the plugging assembly 19. After the water enters the water inflow chamber 256, it opens the first water stopping flange portion 265 and enters the first water discharging chamber 254, thereby causing the first outlet 252 to discharge water.

Since the plugging assembly 19 in the second receiving hole 215*b* is blocked by the main body of the rotatable disc 24', so that the plugging assembly 19 blocks the second water passing hole 263, the second water stopping flange portion 266 contacts the water stopping ribs 257 on the lower valve body 25', and the water enters the water receiving chamber 261 through the overflow hole 264 on the periphery of the first water stopping flange portion 265 and the second water stopping flange portion 266 on the water stopping member 26'. At this time, the upper water contact area of the second water stopping flange portion 266 is larger than the lower water contact area thereof, thereby generating a water pressure difference thereon. Under the action of the water pressure difference, the second water stopping flange portion 266 is tightly sealed to the water stopping ribs 257 on the lower valve body 25', so that the water cannot enter the second water discharging chamber 255, therefore the second outlet 253 does not discharge water.

As shown in the top view at the top right corner of FIG. 14, the rotatable disc 24' is located in the page and extends downward, and the switching hole thereon just receive the plugging assembly in the first receiving hole 215*a*. In conjunction with FIGS. 9, 10 and 11, the switching shaft ribs 212*b* are placed in the guide slot 258 of the lower valve body 25' and move along the guide slot 258 of the lower valve body. The oblique teeth 212*a* for the switching shaft cooperate with oblique teeth 242 for the rotatable disc, and the rotatable disc ribs 241 are placed in the guide slot 258 of the lower valve body 25' and move along the guide slot 258 of the lower valve body.

Referring to FIG. 15, when the button 216 is pressed, the button 216 pushes the switching shaft 212 to move upward vertically, and the switching shaft 212 pushes the rotatable disc 24' to move upward vertically; when the rotatable disc ribs 241 move away from the guide slot 258 of the lower valve body, the oblique teeth 212*a* for the switching shaft and the oblique teeth 242 for the rotatable disc cooperate with each other to rotate the rotatable disc 24' by a predetermined angle (for example, 90°). At this time, in the page of the corresponding top view, the rotatable disc 24' is rotated to the left by 90° relative to the position shown in FIG. 14.

Referring to FIG. 15, when the button 216 is released, the switching shaft 212 and the button 216 are restored to an original state under a spring force of the first spring 211. The oblique teeth 242 for the rotatable disc cooperate with the oblique teeth 258*a* for the lower valve body, and the rotatable disc 24' is driven to rotate by a predetermined angle (for example, 90°) under a spring force of the second spring 23', and the rotatable disc ribs 241 slide into the guide slot 258 of the lower valve body, and move along the guide slot 25 until two of the switching holes 244 in the rotatable disc 24' selectively receive the plugging assemblies in the first receiving hole 215*a* and the second receiving hole 215*b* in the water stopping member 26' (that is, the switching hole 244 on the rotatable disc 24' is rotated to the left by 90° relative to the position shown in FIG. 11 in the page of the corresponding top view).

At this time, the first water passing hole 262 is not blocked, and after the water enters the water inflow chamber 256, the water urges the first water stopping flange portion 265 to open and flows into the first water discharging chamber 254, thereby causing the water to be discharged from the first outlet 252. Similarly, the second water passing hole 263 is not blocked, and after the water enters the water inflow chamber 256, the water urges the second water stopping flange portion 266 to open and flows into the second water discharging chamber 255, thereby causing the water to be also discharged from the second outlet 253.

Referring to FIG. 13, the button 216 is pressed again (the button 216 is pressed for the second time), so that the switching hole 244 (with reference to FIG. 20) in the rotatable disc 24' is rotated by 90° again, and the switching hole 244 just receives the plugging assembly in the second receiving hole 215*b*, thus the second water passing hole 263 is not blocked. Similar to the initial state, this will cause the water to pass through the second water discharging chamber 255 and cause the water to be discharged from the second outlet 253, but no water is discharged from the first outlet 252.

Referring to FIG. 14, the button 216 is pressed again (the button 216 is pressed for the third time), so that the switching holes 244 in the rotatable disc 24' are rotated by 90° again, and the two switching holes 244 opposite to each other respectively receive the plugging assemblies in the first receiving hole 215*a* and the second receiving hole 215*b* in the water stopping member 26'.

Similar to the state II, at this time, since the switching holes 244 do not block the first water passing hole 262 and the second water passing hole 263, the water is discharged from both the first outlet 252 and the second outlet 253.

It should be noted that, in the embodiments of the present disclosure, the water stopping pad is provided with a first water stopping flange portion at a portion thereof corresponding to the first water discharging chamber and a second water stopping flange portion at a portion thereof corresponding to the second water discharging chamber, the first water passing hole is located at a region surrounded by the first water stopping flange portion, and the second water passing hole is located at a region surrounded by the second water stopping flange portion. However, it is also possible to provide, as needed, water receiving holes angled by other angles or a plurality of protrusions, so that the water is not discharged from the first outlet and the second outlet in a certain state. In view of the above, they can be obtained based on the disclosure of the present disclosure without any creative effort, and therefore they will not be discussed in detail herein.

Specifically, in conjunction with FIG. 20, the left subview shows that the rotatable disc 24' is provided with three adjacent receiving holes, which are located on the substantially same circumference of the rotatable disc 24' and spaced apart from each other by an angle of about 90 degrees. Through the rotation of the rotatable disc 24' and the cooperation of the rotatable disc with the plugging assembly, the water can be discharged from a single one of the two outlets of the pipeline valve V2, from both outlets, or from the other one of the two outlets, as described above.

In one example, when the pipeline valve V2 is used for a shower, one of the outlets can be served for discharging massage or jet-style water with greater discharge pressure, the other outlet can be served for discharging a shower stream of water with lesser discharge pressure. The discharge from both outlets refers to the case where the shower water and the massage water flow out at the same time.

The middle sub-view in FIG. 20 shows another alternative example of the present disclosure. The rotatable disc 24' may be alternatively provided with two adjacent receiving holes, which are located on the substantially same circumference of the rotatable disc 24' and spaced apart from each other by an angle of about 90 degrees. Through the rotation of the rotatable disc 24' and the cooperation of the rotatable disc with the plugging assembly, it is possible to achieve that the water is discharged from only one of the outlets, and there is no mixed water flowing out.

The right sub-view in FIG. 20 shows another alternative example of the present disclosure. The rotatable disc 24' may be alternatively provided with one receiving hole, which is located on a circumference of the rotatable disc 24'. Through the rotation of the rotatable disc 24' and the cooperation of the rotatable disc with the plugging assembly, the water can flow in the following sequence: the water is discharged from one of the two outlets; the water is not discharged from either of the two outlets; the water is discharged from the other of the two outlets; the water is not discharged from either of the two outlets. Through the above example, the number of receiving holes in the rotatable disc 24' may be set as needed to adjust the water discharging condition of the two outlets. In the pipeline valve V2 for closing and/or switching according to the present disclosure, it can achieve the switch of the water discharging states between the first outlet and/or the second outlet by applying a small force, by means of the cooperation of the switching assembly 17 with the water stopping member.

While the embodiments of the present disclosure have been shown and described above, it should be understood that the above embodiments are illustrative and are not to be construed as limiting the present disclosure. Changes, modifications, substitutions and variations may be made to the above embodiments by those skilled in the art within the scope of the present disclosure. It is to be understood that the invention is not limited to the exact details of construction, operation, exact materials or embodiments shown and described, as obvious modifications and equivalents will be apparent to one skilled in the art. Accordingly, the invention is therefore to be limited only by the scope of the appended claims. While the specific embodiments have been illustrated and described, numerous modifications come to mind without significantly departing from the spirit of the invention, and the scope of protection is only limited by the scope of the accompanying Claims.

What is claimed is:

1. An adjustable water valve for changing a discharge water flow path, the water valve comprising:
    a valve body having an inlet and at least one outlet;
    a water stopping member located within a chamber of the valve body between the inlet and the at least one outlet;
    a plugging assembly located in at least one receiving hole in the valve body, the at least one receiving hole being in one-to-one correspondence with at least one water passing hole in the water stopping member; and
    a switching assembly configured to allow the plugging assembly to block a corresponding water passing hole by a rotation of the switching assembly to change the communication between the inlet and the at least one outlet;
    wherein the valve body comprises an upper valve body and a lower valve body;
    wherein at least one water discharging chamber is provided at a middle portion of the lower valve body, and a water inflow chamber is provided at a peripheral portion of the lower valve body, the at least one water discharging chamber is closed by the water stopping member, and the water inflow chamber is closed by the water stopping member and communicated with the inlet; and
    wherein the at least one receiving hole comprises a first receiving hole and a second receiving hole, and the at least one water passing hole comprises a first water passing hole and a second water passing hole.

2. The adjustable water valve of claim 1, wherein the switching assembly comprises a rotatable disc above the upper valve body, at least one switching hole is provided in the rotatable disc, and the at least one switching hole is configured to receive the plugging assembly.

3. The adjustable water valve of claim 2, wherein the plugging assembly comprises a seal shaft, a seal body at a first end of the seal shaft, a seal ring at a second end of the seal shaft, and a spring located on the seal shaft.

4. The adjustable water valve of claim 3, wherein a ring-shaped protrusion is provided in the upper valve body, and the seal ring and the spring are sequentially disposed on a side of the protrusion facing away from a protruding portion at an end of the seal shaft connected to the seal body.

5. The adjustable water valve of claim 4, wherein the seal body has a substantially epsilon-shaped cross section.

6. The adjustable water valve of claim 4, wherein a hole is provided at a center of the seal ring.

7. The adjustable water valve of claim 2, wherein a fluid entering the water inflow chamber from the inlet flows into a second water discharging chamber through a gap between the water stopping member and the lower valve body, and wherein the fluid flows out from a second outlet of the valve body.

8. The adjustable water valve of claim 7, wherein the water stopping member has a guide slot at its center.

9. The adjustable water valve of claim 8, wherein the switching assembly comprises a switching shaft, a first spring, the rotatable disc, a guide shaft, and a second spring.

10. The adjustable water valve of claim 9, wherein the switching assembly further comprises a button:
    wherein when the button is pressed, the button pushes the switching shaft to move upward, and the switching shaft pushes the rotatable disc to move upward to rotate the rotatable disc by a first predetermined angle; and,
    wherein when the button is released, the switching shaft and the button are restored to an original state under a spring force of the first spring.

11. The adjustable water valve of claim 2, wherein the water stopping member comprises a water stopping pad made of an elastic material.

12. The adjustable water valve of claim 2, wherein the rotatable disc comprises one or more switching holes provided thereon for receiving the plugging assembly.

13. An adjustable water valve for changing a discharge water flow path, the pipeline valve comprising:

a valve body;

an inlet in communication with the valve body; and at least one outlet in communication with the valve body, a water stopping member located within a chamber of the valve body between the inlet and the at least one outlet;

a switching assembly configured to cooperate with at least two corresponding water passing holes in the water stopping member by a rotation of the switching assembly to vary the communication between the inlet and the at least one outlet;

a plugging assembly located in at least two receiving holes in the valve body; and at least one switching hole provided in a rotatable disc, wherein said switching hole is configured to receive the plugging assembly.

14. The adjustable water valve of claim 13, wherein the at least two receiving holes being in one-to-one correspondence with the at least two water passing holes.

15. The adjustable water valve of claim 13, wherein the valve body comprises an upper valve body and a lower valve body.

16. The adjustable water valve of claim 15, wherein the rotatable disc is located above the upper valve body.

17. The adjustable water valve of claim 13, wherein the plugging assembly comprises a seal shaft, the seal shaft comprising a seal body, a seal ring, and a spring.

18. An adjustable water valve for changing a discharge water flow path, the adjustable water valve comprising:

a valve body;

an inlet in communication with the valve body; and at least one outlet in communication with the valve body, a water stopping member located within a chamber of the valve body between the inlet and the at least one outlet;

a switching assembly configured to cooperate with at least two corresponding water passing holes in the water stopping member by a rotation of the switching assembly to vary the communication between the inlet and the at least one outlet; and a plugging assembly located in at least two receiving holes in the valve body, wherein the plugging assembly comprises a seal shaft assembly having a seal body, a seal ring, and a spring.

19. The adjustable water valve of claim 18, wherein the valve body comprises an upper valve body and a lower valve body.

20. The adjustable water valve of claim 19, wherein the switching assembly comprises a rotatable disc located above the upper valve body.

* * * * *